(12) United States Patent
Que

(10) Patent No.: US 12,129,947 B2
(45) Date of Patent: Oct. 29, 2024

(54) QUICK CONNECTOR

(71) Applicant: A. RAYMOND ET CIE SCS, Grenoble (FR)

(72) Inventor: Feng Que, Jiangsu (CN)

(73) Assignee: A. RAYMOND ET CIE, Grenoble (FR)

( * ) Notice: Subject to any disclaimer, the term of this patent is extended or adjusted under 35 U.S.C. 154(b) by 437 days.

(21) Appl. No.: 17/419,586

(22) PCT Filed: Dec. 26, 2019

(86) PCT No.: PCT/CN2019/128571
§ 371 (c)(1),
(2) Date: Jun. 29, 2021

(87) PCT Pub. No.: WO2020/135553
PCT Pub. Date: Jul. 2, 2020

(65) Prior Publication Data
US 2022/0074529 A1   Mar. 10, 2022

(30) Foreign Application Priority Data

Dec. 29, 2018 (CN) .......................... 201811634746.2
Dec. 29, 2018 (CN) .......................... 201822245880.5

(51) Int. Cl.
F16L 37/088 (2006.01)
F16L 37/14 (2006.01)
F16L 37/091 (2006.01)

(52) U.S. Cl.
CPC ......... *F16L 37/0885* (2019.08); *F16L 37/144* (2013.01); *F16L 37/091* (2013.01)

(58) Field of Classification Search
CPC . F16L 37/0885; F16L 37/1225; F16L 37/144; F16L 2201/10
See application file for complete search history.

(56) References Cited

U.S. PATENT DOCUMENTS 5,490,694 A   2/1996   Shumway
8,033,575 B2  10/2011  Tsurumi
(Continued)

FOREIGN PATENT DOCUMENTS

CN   101660642 A   3/2010
CN   107061897 U   8/2017
(Continued)

OTHER PUBLICATIONS

English translation of International Search Report for PCT/CN2019/128571 dated Apr. 3, 2020, 2 pages.
(Continued)

*Primary Examiner* — Zachary T Dragicevich
(74) *Attorney, Agent, or Firm* — Warner Norcross + Judd LLP

(57) ABSTRACT

A quick connector comprises a sleeving component and a sliding lock. The sleeving component comprises a stop part configured to stop the automatic moving of the sliding lock toward the interior of the sleeve component in the transverse direction when a fluid pipeline is inserted into the sleeving component, and release the stopping of the sliding block when the fluid pipeline is completely pushed into a main body of the sleeving component. The sliding lock further comprises at least one locking hook, and the locking hooks matches a locking catch arranged in the main body of the sleeving component. When a fluid pipeline is completely pushed into the main body of the sleeving component, the locking hooks moves around the locking catch and finally surrounds the locking catch.

15 Claims, 27 Drawing Sheets

(56) References Cited

U.S. PATENT DOCUMENTS

| | | | |
|---|---|---|---|
| 2007/0273150 A1* | 11/2007 | Tsurumi | F16L 37/144 |
| 2010/0052315 A1 | 3/2010 | Kerin et al. | |
| 2010/0276924 A1* | 11/2010 | Gillet | F16L 37/144 |
| | | | 285/93 |
| 2012/0326435 A1* | 12/2012 | Okazaki | F16L 37/0885 |
| 2017/0067588 A1 | 3/2017 | Chaupin et al. | |
| 2017/0146173 A1 | 5/2017 | Chaupin et al. | |
| 2018/0306363 A1* | 10/2018 | Oberdörfer | F16L 37/144 |

FOREIGN PATENT DOCUMENTS

| | | |
|---|---|---|
| CN | 109737260 A | 5/2019 |
| CN | 209385877 U | 9/2019 |
| JP | 2004211812 A | 7/2004 |

OTHER PUBLICATIONS

English translation of Written Opinion of the International Search Authority for PCT/CN2019/128571 dated Apr. 3, 2020, 3 pages.
Machine assisted English translation of CN209385877 obtained from https://worldwide.espacenet.com on Jun. 29, 2021, 27 pages.
Machine assisted English translation of CN109737260A obtained from https://worldwide.espacenet.com on Jun. 29, 2021, 26 pages.
Machine assisted English translation of JP2004211812A obtained from https://worldwide.espacenet.com on Jun. 29, 2021, 29 pages.

* cited by examiner

QUICK CONNECTOR

CROSS-REFERENCE TO RELATED APPLICATIONS

This application is the U.S. National Stage of International Application No. PCT/CN2019/128571 filed on 26 Dec. 2019, which claims priority to and all advantages of Chinese Application No. 201811634746.2, filed on 29 Dec. 2018, and Chinese Application No. 201822245880.5, filed on 29 Dec. 2018, which are incorporated by reference herein.

TECHNICAL FIELD

The present invention generally relates to a connector for a fluid pipeline. More specifically, the present invention relates to a quick connector for connecting one fluid pipeline/device to another fluid pipeline/device.

BACKGROUND ART

In many industries, it is necessary to connect a first fluid pipeline to a second fluid pipeline. Generally, in the automotive industry, it is necessary to deliver fluids, such as gasoline, oil, coolant and brake fluid, between a first position and a second position on a vehicle. The two positions are usually far apart from each other. It is important that pipelines for delivering these fluids are easy to install, firm and leak-proof.

The point where a fluid pipe has the highest risk of leakage is a connecting point. Aware of this problem, designers of fluid pipeline connectors are in an effort to build firm connectors that deliver fluids without leakage when correctly mounted. An early solution that meets the requirements of firm connection and leak prevention comprises a threaded fastener for connecting one pipeline to another.

Although proper leak-proof sealing is ensured when a threaded fastener is properly mounted, an installer needs to use two wrenches for the threaded fastener, which requires a considerable assembly time. In order to reduce the time required to connect a first fluid pipeline to a second fluid pipeline, a quick connector was developed. Modern quick connectors are mounted between two fluid pipelines. At least one fluid pipeline can be easily connected by simply inserting the pipeline into the quick connector. A locking device in the quick connector maintains the fluid pipeline by engaging with a radially enlarged flange or a radially recessed annular groove formed on the fluid pipeline. In some cases, the fluid pipeline can be released from the quick connector through a release button in the quick connector. The known quick connectors often easily connect one fluid pipeline to another without leakage.

Although adequate solutions have been provided for many purposes, the design of the known quick connectors has certain limitations. For example, applications with a compact installation space raise higher requirements for the size design of quick connectors, and the existing quick connectors may not meet such requirements.

For example, Chinese patent No. CN 107061897 A discloses a safety pipe joint with automatic connection, comprising a female connector and a connecting element, the female connector having a main body into which a male connector having an annular ferrule is axially inserted, and the connecting element extending in a lateral direction within the main body of the female connector. The connecting element is designed to mechanically interfere with the ferrule during insertion of the male connector and automatically move laterally towards the inside of the female connector. The connecting element comprises a locking hook that cooperates with a locking retainer disposed in the female connector, and the hook passes over the fastener due to the mechanical interference of axial and radial elastic deformation of a drive connecting element of the ferrule. When the connecting element is fully pushed into the female connector, the hook is locked to the fastener. Although this document proposes a solution for visual mistake-proofing and automatic locking, this technical solution is directed to a male connector having an annular ferrule, which cannot be applied to a male connector with a slot and thus cannot adapt to the current compact installation environment.

Accordingly, an improved quick connector for fastening a first fluid pipeline to another fluid pipeline easily is still needed.

BRIEF SUMMARY OF THE INVENTION

The purpose of the present invention is to provide a quick connector to improve quick connecting devices in the prior art.

The present invention provides a quick connector. The quick connector comprises a sleeving component and a sliding lock; the sleeving component comprises a main body defining a receiving hole, wherein the receiving hole is used for receiving a fluid pipeline inserted therein an axial direction and having an annular groove; the sliding lock extends in an inner recess in the main body of the sleeving component in a transverse direction, and the sliding lock is configured to radially elastically deform towards the outside of the sleeving component via mechanical interference with an end of the fluid pipeline during the insertion of the fluid pipeline into the sleeving component, and tend to automatically move towards the interior of the sleeving component in the transverse direction in response to the radial elastic deformation; the sleeving component further comprises a stop component configured to stop the automatic movement of the sliding lock towards the interior of the sleeving component in the transverse direction during the insertion of the fluid pipeline into the sleeving component, and to release the stopping of the sliding block when the fluid pipeline is completely pushed into the main body of the sleeving component; and the sliding lock further comprises at least one locking hook, wherein the locking hook matches a locking catch provided in the main body of the sleeving component, and when the fluid pipeline is completely pushed into the main body of the sleeving component, the locking hook moves around the locking catch and finally surrounds the locking catch.

In some embodiments, the stop component is configured to radially elastically deform towards the outside of the sleeving component via mechanical interference with the end of the fluid pipeline during the insertion of the fluid pipeline into the sleeving component so as to stop the sliding lock, and to release the mechanical interference with the end of the fluid pipeline when the fluid pipeline is completely pushed into the main body of the sleeving component so as to release the stopping of the sliding lock under the action of an elastic restoring force.

In some embodiments, the sliding lock comprises a first fork and a second fork; the first fork comprises two retaining arms embeddable into the annular groove of the fluid pipeline; and the second fork comprises two locking arms, each of the locking arms comprises the locking hook, and the locking hook comprises an opening radially facing the interior of the sleeving component.

In some embodiments, the retaining arm is configured to comprise a stop face that prevents the fluid pipeline from being inserted into the receiving hole after the sliding lock is accidentally moved into a locked position.

In some embodiments, the stop component comprises two wings extending in a circumferential direction of the receiving hole of the sleeving component each of the wings comprising a wing protrusion protruding radially towards the interior of the sleeving component.

In some embodiments, the wing is configured such that when the wing protrusion mechanically interferes with the end of the fluid pipeline, an end of the wing faces an end of the retaining arm of the sliding lock, and when the wing protrusion is embedded into the annular groove of the fluid pipeline, the end of the wing is offset from the end of the retaining arm of the sliding lock.

In some embodiments, the main body of the sleeving component comprises an outer main body portion and an inner main body portion that are sleeved to each other, and the stop component is provided on the inner main body portion.

In some embodiments, the wings extend from a bottom of the inner main body portion in the circumferential direction of the receiving hole of the sleeving component.

In some embodiments, the wings are configured such that when the wing protrusions mechanically interfere with the end of the fluid pipeline, the ends of the wings and the ends of the retaining arms are engaged with each other, and when the wing protrusions are embedded into the annular groove of the fluid pipeline, the ends of the wings are disengaged from the ends of the retaining arms. In some embodiments, portions of the wings facing the ends of the retaining arms are provided with teeth protruding towards the ends of the retaining arms; and the ends of the retaining arms are provided with teeth that match the teeth of the wings, and the engagement with the wings is achieved via the teeth, thereby preventing the transverse movement of the sliding lock.

In some embodiments, the number of the teeth of the end of the retaining arm is greater than that of the teeth of the wing.

In some embodiments, the wing protrusion is configured not to impede insertion or pullout of the fluid pipeline into/from the receiving hole.

In some embodiments, the sliding lock comprises an interference portion provided on a front side thereof, the interference portion being inclined relative to the axial direction, and the interference portion being arranged below the middle of the receiving hole of the sleeving component.

In some embodiments, the sliding lock and the main body of the sleeving component are configured such that during the mechanical interference, the locking hook axially protrudes into the main body of the sleeving component before the sliding lock radially elastically deforms, and that the locking hook moves around the locking catch and finally surrounds the locking catch in response to the radial elastic deformation and axial elastic deformation of the sliding lock.

In some embodiments, a bottom of the locking hook initially abuts against the locking catch, the locking hook is in the inner recess of the main body of the sleeving component, and the locking hook is arranged in a gap region.

The quick connector of the present invention has the following beneficial effects: the quick connector is smaller in size and has a visual mistake-proofing function, and the sliding lock would not move to the locked position even under an external force during the insertion of the fluid pipeline. When the fluid pipeline is inserted into the fixing position, the sliding lock automatically moves to the locked position without the need for manually pressing the sliding lock to the locked position, so that the operation is more convenient.

The above advantages and other advantages and features will become apparent from the following detailed descriptions of exemplary embodiments with reference to the accompanying drawings.

BRIEF DESCRIPTION OF THE DRAWINGS

For a more complete understanding of the present invention, reference should now be made to the embodiments illustrated in the accompanying drawings in more detail and described by examples of the present invention below, in the drawings.

Figure 1:
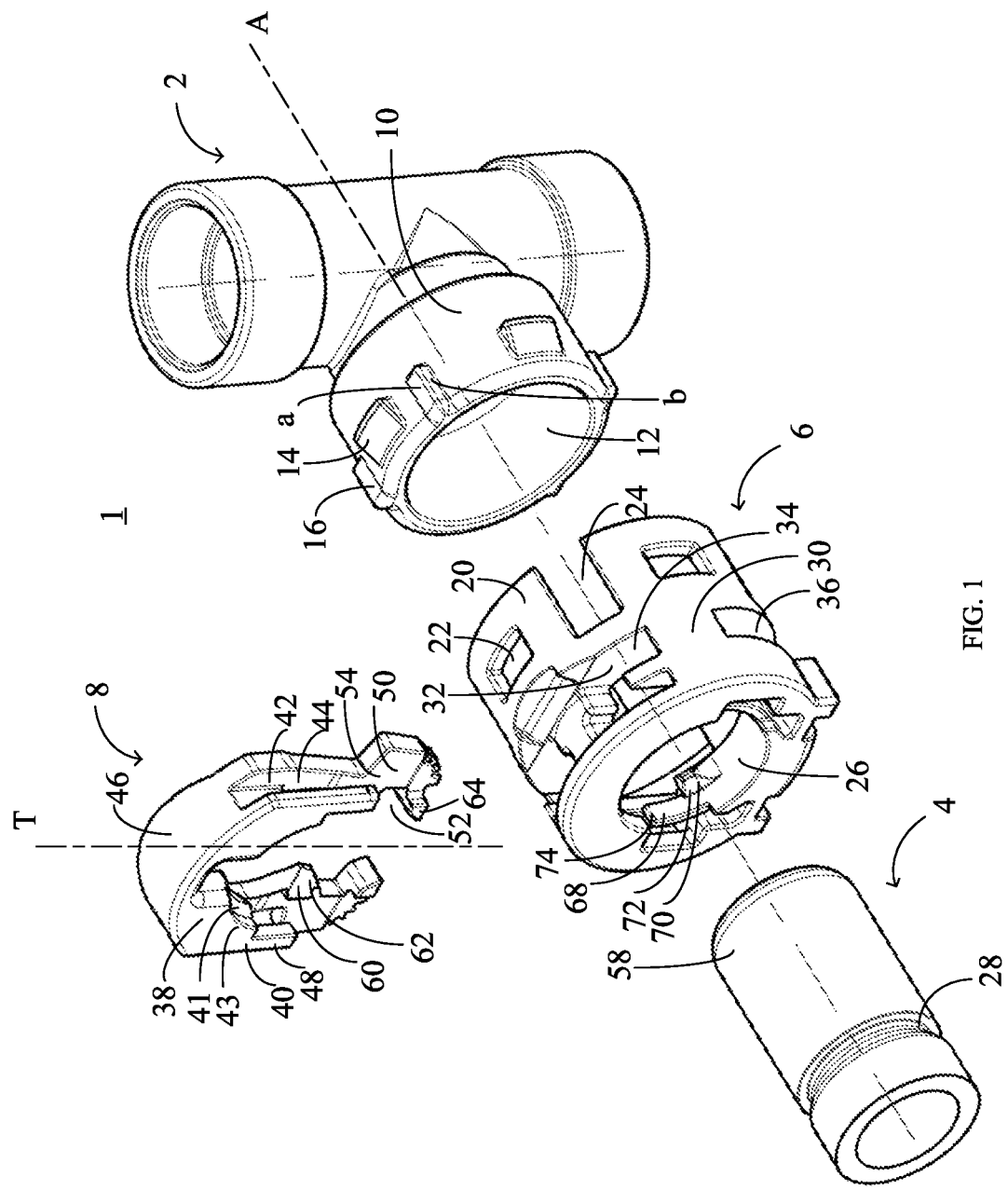
FIG. 1 is an exploded schematic diagram, from one angle of view, of a quick connector according to a first embodiment of the present invention.

| Reference signs: | | | |
|---|---|---|---|
| First embodiment | | | |
| Quick connector | 1 | Locking catch | 37 |
| Joint section | 2 | First fork | 38 |
| Fluid pipeline | 4 | Gap | 39 |
| Sleeving component | 6 | Retaining arm | 40 |
| Sliding lock | 8 | Retaining flange | 41 |
| Accommodating | 10 | Second fork | 42 |
| portion | | | |
| Open passage | 12 | Stop face | 43 |
| Engagement projection | 14 | Locking arm | 44 |
| Positioning rib | 16 | U-shaped bottom | 46 |
| Wall surface | 18 | End | 48 |
| Retainer | 20 | C-shaped locking hook | 50 |
| Engagement opening | 22 | Opening | 52 |
| Channel | 24 | Front side | 54 |
| First flat face | a | End face | 56 |
| Second flat face | b | End | 58 |
| Axial | A | Interference portion | 60 |
| Receiving hole | 26 | Bevel | 62 |
| Annular groove | 28 | Bump | 64 |
| Main body | 30 | Protrusion | 66 |
| Inner recess | 32 | Wing | 68 |
| Radial opening | 34 | Wing protrusion | 70 |
| Transverse | T | Bevel | 72 |
| Gap region | 36 | End | 74 |
| Second embodiment and variant thereof | | | |
| Quick connector | 101 | Second fork | 142 |
| Joint section | 102 | Locking arm | 144 |
| Fluid pipeline | 104 | U-shaped bottom | 146 |
| Sleeving component | 106 | End of retaining arm | 148; 148' |
| Sliding lock | 108 | End face of fluid pipeline | 156 |
| Receiving hole | 126 | Hole | 157 |
| Annular groove | 128 | End of fluid pipeline | 158 |
| Main body | 130 | Inner radial opening | 159 |
| Inner main body portion | 131 | Outer radial opening | 161 |
| Outer main body portion | 133 | Wing | 168; 168' |
| First fork | 138 | Teeth of wing | 169; 169' |
| Retaining arm | 140; 140' | Wing protrusion | 170 |
| Teeth of retaining arm | 141; 141' | End of wing | 174; 174' |

DETAILED DESCRIPTION OF EMBODIMENTS

As will be understood by those of ordinary skill in the art, various features of the embodiments shown and described with reference to any one of the drawings could be combined with the features shown in one or more other drawings to produce other embodiments that are not explicitly shown or described. The combinations of features shown provide representative embodiments for typical applications. However, various combinations and modifications of the features are desirable in accordance with the teachings of the present disclosure for specific applications or implementations.

Quick connectors according to the present invention are shown in the accompanying drawings. The quick connectors shown in the accompanying drawings and discussed herein are suitable for various applications including and beyond the automotive field. Particularly, the quick connector may be used in any environment where a first fluid pipeline is connected to a second fluid pipeline. Such environments include, but are not limited to, airplanes, locomotives and ships. Other environments include factories and commercial and residential districts.

The quick connector of the present invention is shown to have a T-shaped body. It should be understood that the body of the quick connector of the present invention may be L-shaped, or may be actually in any other shape required for a particular purpose. Furthermore, the illustrated quick connector is shown to have such a body that has a first end in the form of a quick connecting device, and a second end and a third end in the form of conduits, the second end and the third end being connected to a flexible pipe or any other type of pipe. Alternatively, the quick connector of the present invention may comprise quick connecting devices at its two ends. Therefore, the illustrated quick connector is intended to be inspiring but not limiting.

Figure 2:
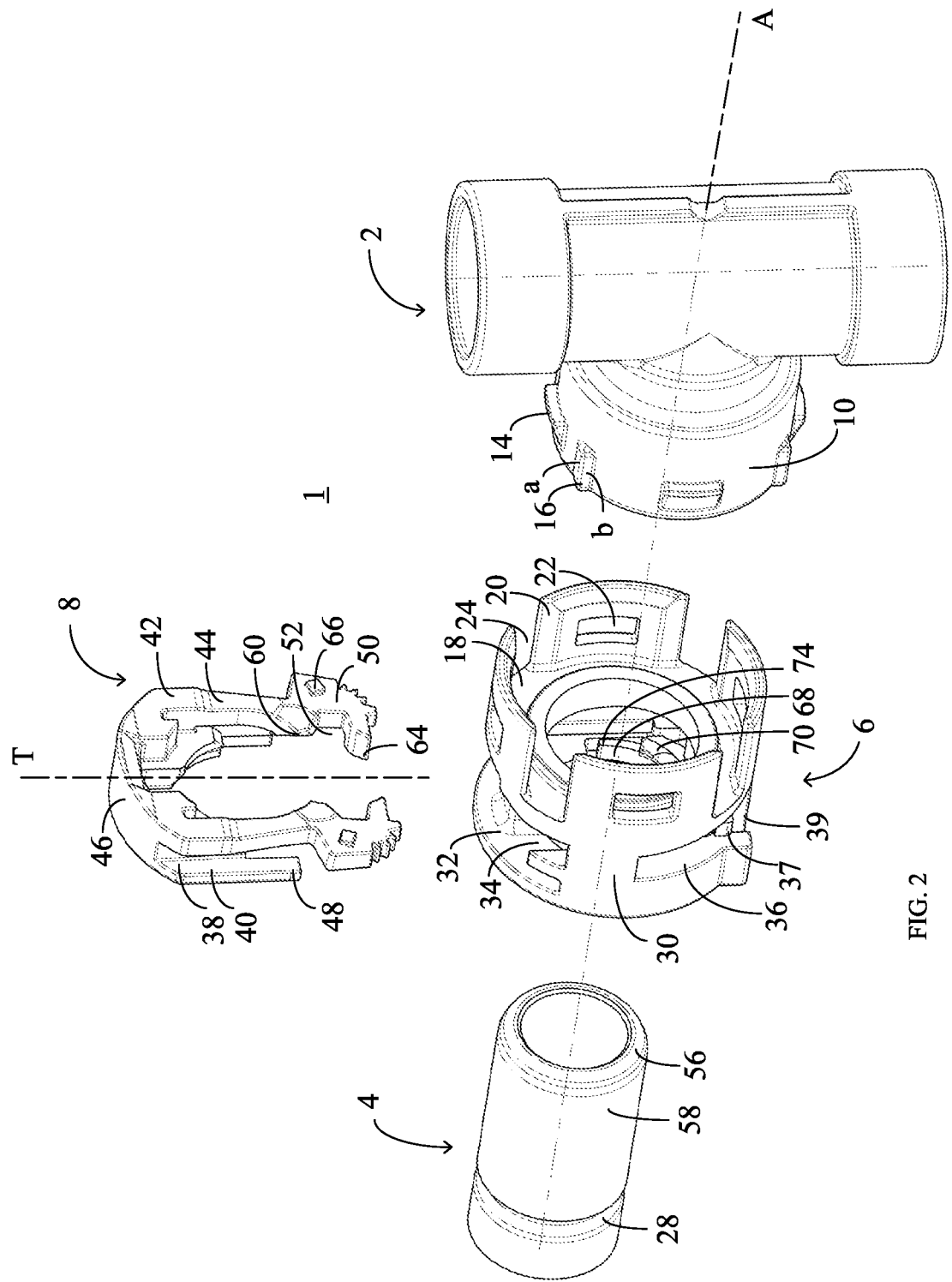
FIG. 2 is an exploded schematic diagram, from another angle of view, of the quick connector according to the first embodiment of the present invention.

FIGS. 1 and 2 show exploded schematic diagrams of an exemplary quick connector 1 for establishing fluid communication between a first fluid pipeline and a second fluid pipeline according to a first embodiment of the present disclosure. The quick connector 1 mainly comprises a joint section 2, a sleeving component 6 for retaining a fluid pipeline 4, and a sliding lock 8.

As shown in FIGS. 1 and 2, in the illustrated embodiment, the joint section 2 is shown in the form of a T-shaped tee, the joint section 2 comprises an accommodating portion 10, an open passage 12 is formed in the accommodating portion 10, a plurality of engagement projections 14 and a plurality of positioning ribs 16 are uniformly arranged on an annular outer wall of the accommodating portion 10, and the engagement projections 14 and the positioning ribs 16 are arranged alternately. As can be seen from FIGS. 1 and 2, a plurality of retainers 20, on the sleeving component 6, axially extending from its wall surface 18 adjacent to the joint section 2 towards the joint section 2 have engagement openings 22 capable of accommodating the engagement projections 14 and are annularly spaced apart to form, between the respective retainers 20, channels 24 capable of receiving the positioning ribs 16. In this embodiment, four retainers 20 are provided on the sleeving component 6.

Correspondingly, the engagement projections 14 and the positioning ribs 16 of the joint section 2 are respectively arranged radially and symmetrically on the annular outer wall of the accommodating portion 10, wherein the positioning ribs 16 are located between every two engagement projections 14. In this embodiment, the engagement projections 14 are arranged near an inlet end of the accommodating portion 10, and are engageable with the engagement openings 22 of the retainers 20 of the sleeving component 6, so that the sleeving component 6 can be conveniently and unimpededly fitted over the joint section 2 and reliably and fixedly connected thereto. The positioning rib 16 is configured to have a right-angled radial cross-section and comprises a first flat face a and a second flat face b arranged at a right angle, the first flat face a and the second flat face b being respectively in contact with the adjacent retainers 20. When the sleeving component 6 is engaged with the engagement projections 14 of the joint portion 2 via the retainers 20, the positioning ribs 16 slide in along the channels 24 between every two retainers 20. Due to the right-angled radial cross-sections of the positioning ribs 16, the positioning ribs 16 are in surface-line contact or even in surface-surface contact with the channels 24, thereby reliably maintaining the sleeving component 6 and the joint section 2 in a stable engaged state, and preventing the sleeving component 6 from rotating on the annular outer wall of the joint section 2. This engaged fitting can also achieve adjustment of the sleeving component 6 and the joint section 2 at, for example, 90° (as shown in the figures) or even at any suitable angle by setting the numbers and positions of the retainers 20 and the positioning ribs 16, so as to adapt to different assembly requirements and applications.

A seal assembly (not shown) is also generally provided between the sleeving component 6 and the joint section 2. For example, the seal assembly comprises two seal rings and an intermediate ring therebetween. After the sleeving component 6 is connected to the joint section 2 and the fluid pipeline 4 is inserted into the quick connector 1, the seal rings and the intermediate ring will seal the open passage 12 of the joint section 2 and sealingly abut against an abutting end face of the sleeving component 6.

It should be understood that the sleeving component 6 and the joint section 2 may also be interconnected by other means, and the angle formed by the sleeving component 6 and the joint section 2 may be adjusted to be appropriate, so as to adapt to different assembly requirements and applications. Furthermore, the sleeving component 6 and the joint section 2 may also be integrally molded. This is advantageous for applications that do not require an adjustable angle between the sleeving component 6 and the joint section 2. In this embodiment, the diameter of the sleeving component 6 may be set smaller, so that the sleeving component can be applied to a space-tight installation environment.

As shown in FIGS. 1 and 2, in the illustrated embodiment, the fluid pipeline 4 is inserted into the sleeving component 6 in an axial direction A in the quick connector 1. Specifically, the sleeving component 6 comprises a receiving hole 26, and the fluid pipeline 4 is inserted into the receiving hole 26 of the sleeving component 6.

The quick connector 1 of the present invention is mainly configured to connect such a fluid pipeline 4 that is in the form of an elongated cylindrical tube having an annular groove 28 on its circular outer periphery. It should be understood that the diameter of the fluid pipeline 4, except the annular groove 28, is greater than that of the annular groove 28. The diameter of the fluid pipeline 4 is smaller than the inner diameter of the receiving hole 26 of the sleeving component 6, so that the fluid pipeline 4 is inserted into the receiving hole 26.

As shown in FIGS. 1 and 2, in the illustrated embodiment, the sleeving component 6 has a main body 30, the main body 30 has an inner recess 32, the top of the inner recess 32 is provided with a radial opening 34, the radial opening 34 forms a slide channel, and the sliding lock 8 may be inserted into the slide channel in a transverse direction T and slides therein. In the portion of the inner recess 32 below the middle of the receiving hole 26, the inner recess 32 has two gap regions 36, the gap regions 36 are arranged symmetrically, and the gap regions 36 penetrate, in the form of radial slots, the annular outer peripheral surface of the sleeving component 6. Branches (described below) of the sliding lock 8 may be inserted into the two radial slots in the transverse direction, and the branches of the sliding lock 8 may be radially expanded inside the main body 30 of the sleeving component 6.

As shown in FIG. 2, in the illustrated embodiment, a locking catch 37 arranged axially and a gap 39 adjacent to the locking catch 37 are provided in the gap region 36 at the bottom of the sleeving component 6. Another locking catch, not visible in this figure, is provided in another gap region that is symmetrical with the gap region 36, visible in FIG. 2, together with a gap adjacent thereto.

As shown in FIG. 2, in the illustrated embodiment, the locking catch 37 is in a rectangular shape, and may also be in other shapes. The locking catches 37 can stop the sliding lock 8 and lock the sliding lock 8. This will be described in detail below.

The sliding lock 8 will be described below. In this embodiment, the sliding lock 8 is movable between an unlocked position and a locked position after inserted into the main body 30 of the sleeving component 6. The sliding lock 8 in the unlocked position may be referred to FIGS. 3A and 3B, and the sliding lock 8 in the locked position may be referred to FIGS. 6A and 6C. Unless otherwise specified, the description of the mutual positional relationship between the respective elements of the sliding lock 8 and the sleeving component 6 is based on the case that the sliding lock 8 is in the unlocked position.

As shown in FIGS. 1 and 2, in the illustrated embodiment, the sliding lock 8 is in the form of two forks, the first fork 38 is in an inverted U shape and has two retaining arms 40, and the second fork 42 is in an inverted U shape and has two locking arms 44. The two forks are connected together via a U-shaped bottom 46.

As shown in FIGS. 1 and 2, in the illustrated embodiment, the two retaining arms 40 of the first fork 38 are configured to be embeddable into the annular groove 28 of the fluid pipeline 4 to retain and lock the fluid pipeline 4 in the axial direction when the fluid pipeline 4 is completely pushed into the main body 30 of the sleeving component 6. Specifically, retaining flanges 41 of the retaining arms 40 can be embedded into the annular groove 28 of the fluid pipeline 4. A stop face 43 is provided above the retaining flange 41 shown in FIG. 1. FIG. 6D shows that the retaining flanges 41 are embedded into the annular groove 28 of the fluid pipeline 4. FIG. 7 is a partial cross-sectional structural schematic diagram of the quick connector according to the embodiment of the present invention when the fluid pipeline is not inserted into the sleeving component and the sliding lock is accidentally moved to the locked position. As shown in FIG. 7, in the illustrated embodiment, the stop face 43 of the retaining arm 40 abuts against an end face 56 of the fluid pipeline 4. That is, when the sliding lock 8 is in the locked position in the sleeving component 6, the stop face 43 may prevent the fluid pipeline from being inserted into the receiving hole 26 of the sleeving component 6. The two retaining arms 40 of the first fork 38 are separated from each other and extend in the transverse direction. The two retaining arms 40 are molded to have a radius of curvature corresponding to the diameter of the annular groove 28 of the fluid pipeline 4 so as to adapt to be embedded within the annular groove 28 of the fluid pipeline 4. Each retaining arm 40 further comprises an end 48 extending in the transverse direction.

As shown in FIGS. 1 and 2, in the illustrated embodiment, the two locking arms 44 of the second fork 42 are separated from each other and extend in the transverse direction, and the two locking arms 44 are flexible. The two locking arms 44 of the second fork 42 and the two retaining arms 40 of the first fork 38 are slidable in the slide channel defined by the radial opening 34 of the main body 30. Each locking arm 44 has a C-shaped locking hook 50 at its free end, wherein an opening 52 of the C-shaped locking hook 50 faces the interior of the main body 30 of the sleeving component 6. The openings 52 of the two C-shaped locking hooks 50 face each other.

As shown in FIGS. 1 and 2, in the illustrated embodiment, each flexible locking arm 44 of the sliding lock 8 has a front side 54, the front side 54 faces the end face 56 of the inserted fluid pipeline 4 when the sliding lock 8 is engaged within the sleeving component 6, and the front side 54 is referred to as a front side 54 for interference with the end 58 of the fluid pipeline 4.

Figure 3A:
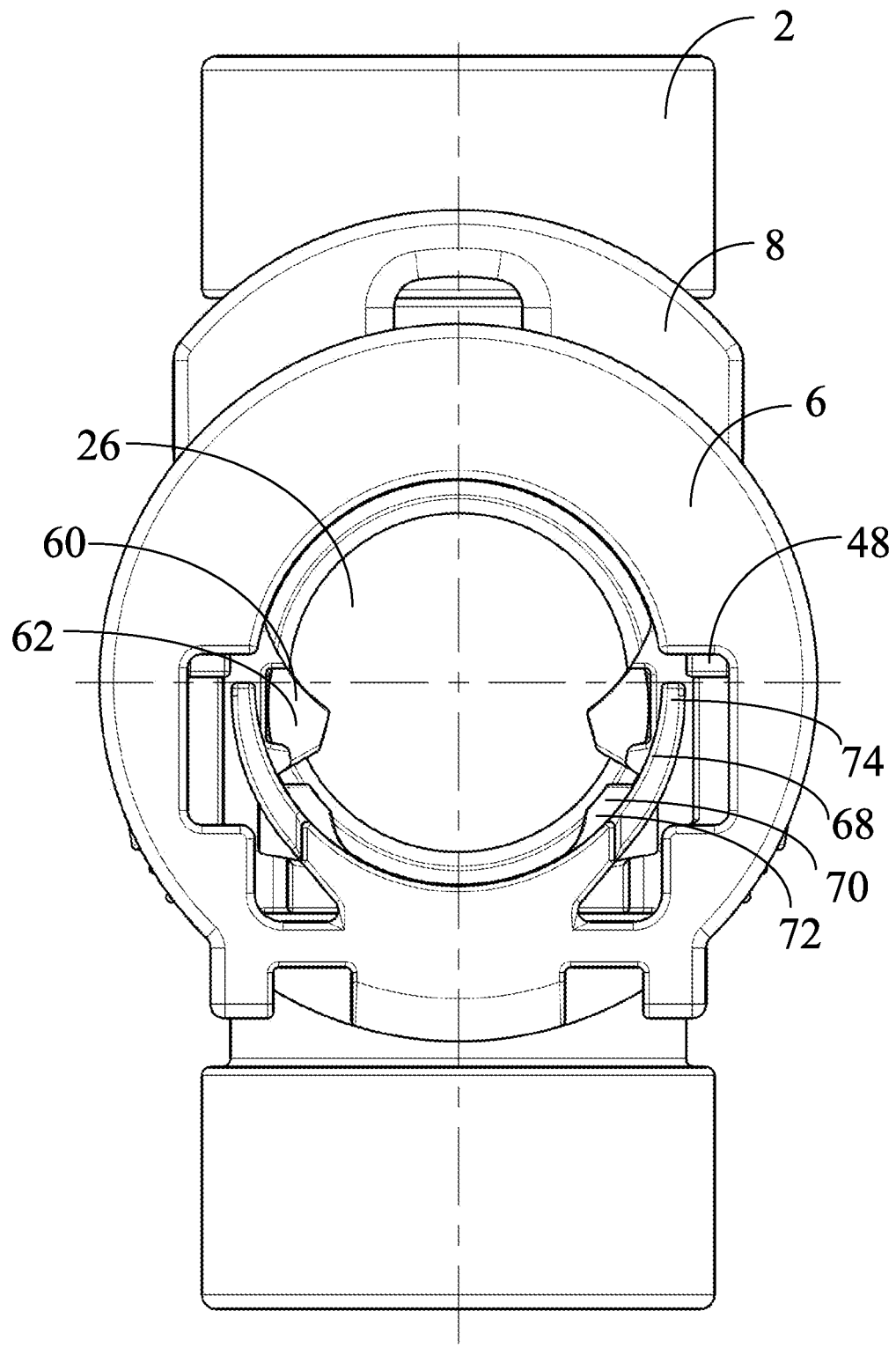
FIG. 3A is a front structural schematic diagram of the quick connector according to the first embodiment of the present invention when a fluid pipeline is not inserted into a sleeving component, showing a sliding lock in an unlocked position within the sleeving component.

As shown in FIGS. 1 and 2, in the illustrated embodiment, the front side 54 of each locking arm 44 comprises an interference portion 60, the interference portion 60 has a bevel 62 inclined relative to the axial insertion direction of the fluid pipeline 4, and the bevel 62 faces the interior of the receiving hole 26 of the sleeving component 6. As shown in FIG. 3A, the interference portion 60 is provided at a position below the middle of the receiving hole 26 of the sleeving component 6. Where the sliding lock 8 is in the unlocked position within the sleeving component 6, the bevel 62 is configured to interfere with the end 58 of the fluid pipeline 4 when the fluid pipeline 4 is inserted into the sleeving component 6.

As shown in FIG. 1, in the illustrated embodiment, each C-shaped locking hook 50 also has a bump 64 that protrudes axially from the front side 54 at the bottom.

As shown in FIG. 2, in the illustrated embodiment, the C-shaped locking hook 50 comprises a protrusion 66 that protrudes axially from a back side opposite the front side 54 of the locking arm 44 of the sliding lock 8, and the protrusion 66 is in the middle of the C-shaped locking hook 50.

When the fluid pipeline 4 is inserted into the sleeving component 6, the end 58 of the fluid pipeline 4 interferes with the interference portions 60 of the locking arms 44 of the sliding lock 8, causing the flexible locking arms 44 to axially then radially elastically deform, and in this state, the C-shaped locking hooks 50 of the locking arms 44 are disengaged from the locking catches 37, that is, the stop of the locking catches 37 on the locking arms 44 is released. Further, the interference portions 60 of the locking arms 44 are provided below the middle of the receiving hole 26 of the sleeving component 6, that is, the position where the interference portions 60 of the locking arms 44 are in contact with the fluid pipeline 4 is below the middle of the fluid pipeline 4, the locking arms 44 are flexible, and the locking arms 44 generate a thrust under the action of their own restoring forces, so that the sliding lock 8 tends to automatically move towards the interior of the sleeving component 6 in the transverse direction, that is, the sliding lock 8 tends to automatically move in the transverse direction towards the locked position.

Figure 3B:
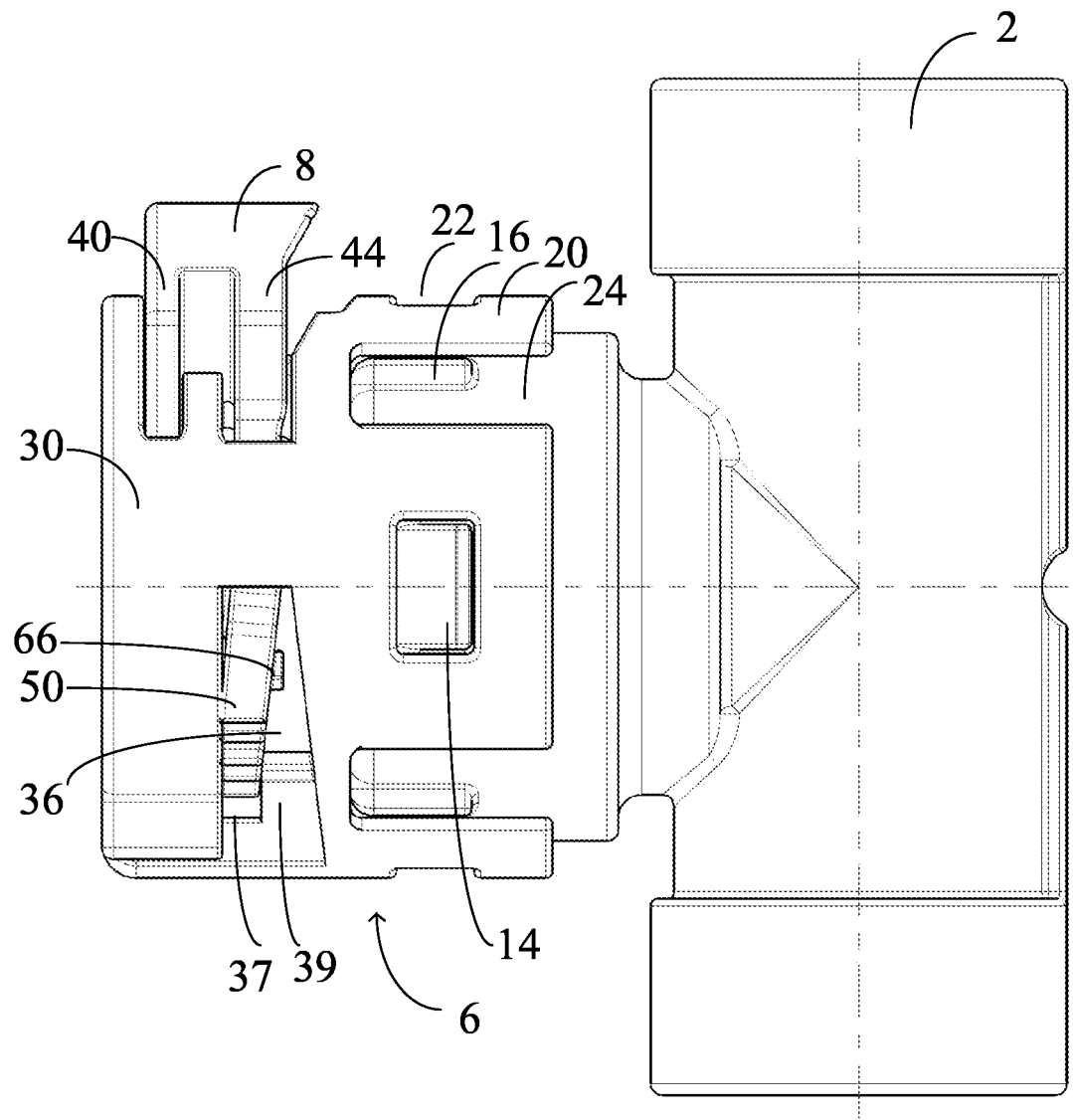
FIG. 3B is a side structural schematic diagram of the quick connector according to the first embodiment of the present invention when the fluid pipeline is not inserted into the sleeving component, showing the sliding lock in the unlocked position within the sleeving component.

As shown in FIGS. 3A and 3B, the sliding lock 8 is in the unlocked position within the sleeving component 6. When the sliding lock 8 is in the unlocked position, the top of the sliding lock 8 protrudes, for example, 3 mm to 6 mm from the outer surface of the top of the sleeving component 6. When the sliding lock 8 is in the locked position (see FIGS. 6A and 6C), the top of the sliding lock 8 is substantially flush with the outer surface of the top of the sleeving component 6. In this way, an operator can reliably distinguish visually or tactilely whether the sliding lock 8 is in the unlocked position or in the locked position within the sleeving component 6. Moreover, as described later, since the sliding lock 8 can be automatically moved to the locked position in the transverse direction only when the fluid pipeline 4 is completely pushed into the sleeving component 6, the operator may also determine whether the fluid pipeline 4 is mounted in place within the sleeving component 6 based on whether the sleeving component 6 is in the locked position.

When the sliding lock 8 is in the unlocked position within the sleeving component 6, the bottom of each C-shaped locking hook 50 of the sliding lock 8 abuts against the corresponding locking catch 37 in the main body 30 of the sleeving component 6, and the locking member stops the sliding lock 8 in this case. Therefore, the sliding lock 8 will not be accidentally moved transversely to the locked position.

As shown in FIGS. 3A and 3B, in the illustrated embodiment, the main body 30 of the sleeving component 6 comprises wings 68 extending in a circumferential direction of the receiving hole 26 and arranged symmetrically, and the wings 68 are flexible and suitable for elastic deformation in a radial direction. Each wing 68 is provided with a wing protrusion 70 protruding towards the interior of the receiving hole 26 in the radial direction. The wings 68 and the wing protrusions 70 provided thereon serve as stop components. The wing protrusions 70 are configured to be insertable into the annular groove 28 of the fluid pipeline 4. The wing protrusion 70 has a bevel 72 inclined relative to the axial insertion direction of the fluid pipeline 4, and the bevel 72 faces the interior of the receiving hole 26 of the sleeving component 6. The bevel 72 is configured to interfere with the end face 56 and the end 58 of the fluid pipeline 4 when the fluid pipeline 4 is inserted into the sleeving component 6. The wing protrusions 70 of the main body 30 of the sleeving component 6 are provided closer to an inlet of the receiving hole 26 of the sleeving component 6 than the interference portions 60 of the sliding lock 8, and therefore, the end face 56 and the end 58 of the fluid pipeline 4 first interfere with the wing protrusions 70 when the fluid pipeline 4 is inserted into the sleeving component 6. The wing protrusions 70 are configured not to impede the insertion or pullout of the fluid pipeline into/from the accommodating portion, and especially in a case that the fluid pipeline is pulled out when the wing protrusions 70 are located in the annular groove 28 of the fluid pipeline, the wing protrusions 70 would not increase a pulling force. It should be understood that in some embodiments, the bevel 72 of the wing protrusion 70 is a spherical or wedge-shaped surface. Alternatively, the entire surface of the wing protrusion 70 is a spherical surface. In other words, the wing protrusion 70 is a spherical protrusion. In this way, it may be more convenient for the fluid pipeline to be inserted into the receiving hole 26 and pulled out of the receiving hole 26 of the sleeving component 6.

When the end 58 of the fluid pipeline 4 interferes with the wing protrusions 70 of the main body 30 of the sleeving component 6, the flexible wings 68 radially elastically deform so that the end 74 of each wing 68 faces the end 48 of each retaining arm 40 of the sliding lock 8, causing the end 74 of each wing 68 to stop the end 48 of each retaining arm 40. That is to say, when the wings 68 radially elastically deform to be spread apart, the wings 68 stop the movement of the sliding lock 8 in the transverse direction.

FIGS. 4A to 6D show schematic diagrams of respective stages in which the fluid pipeline 4 is inserted into the quick connector 1 according to the first embodiment of the present invention. The process in which the fluid pipeline 4 is inserted into and connected and locked to the quick connector 1 of the present invention will be described below with reference to FIGS. 4A to 6D.

As shown in FIGS. 4A to 4D, in the illustrated embodiment, the fluid pipeline 4 is partially inserted into the sleeving component 6.

Figure 4A:
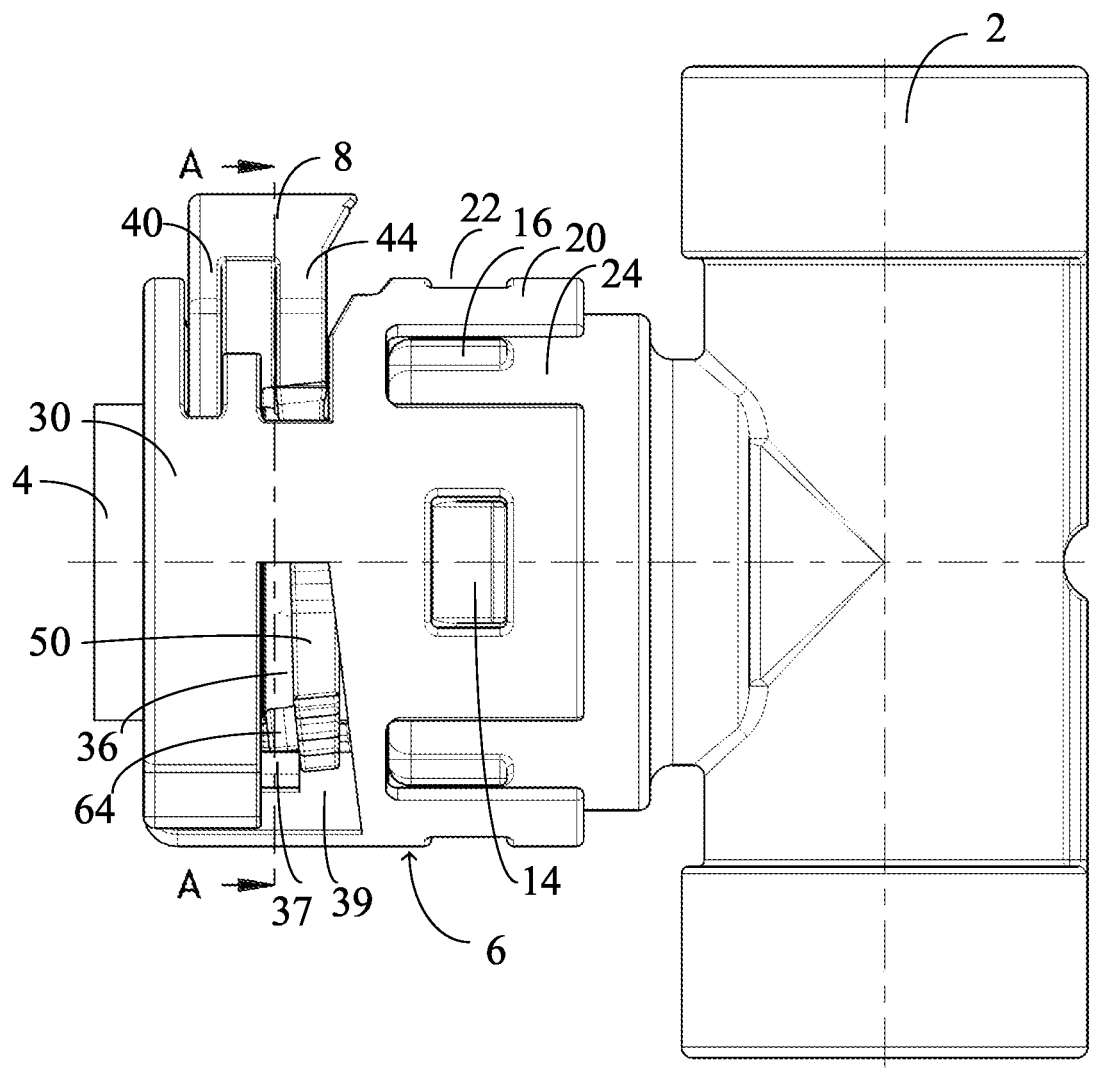
FIG. 4A is a side structural schematic diagram of the quick connector according to the first embodiment of the present invention when the fluid pipeline is partially inserted into the sleeving component.
Figure 4B:
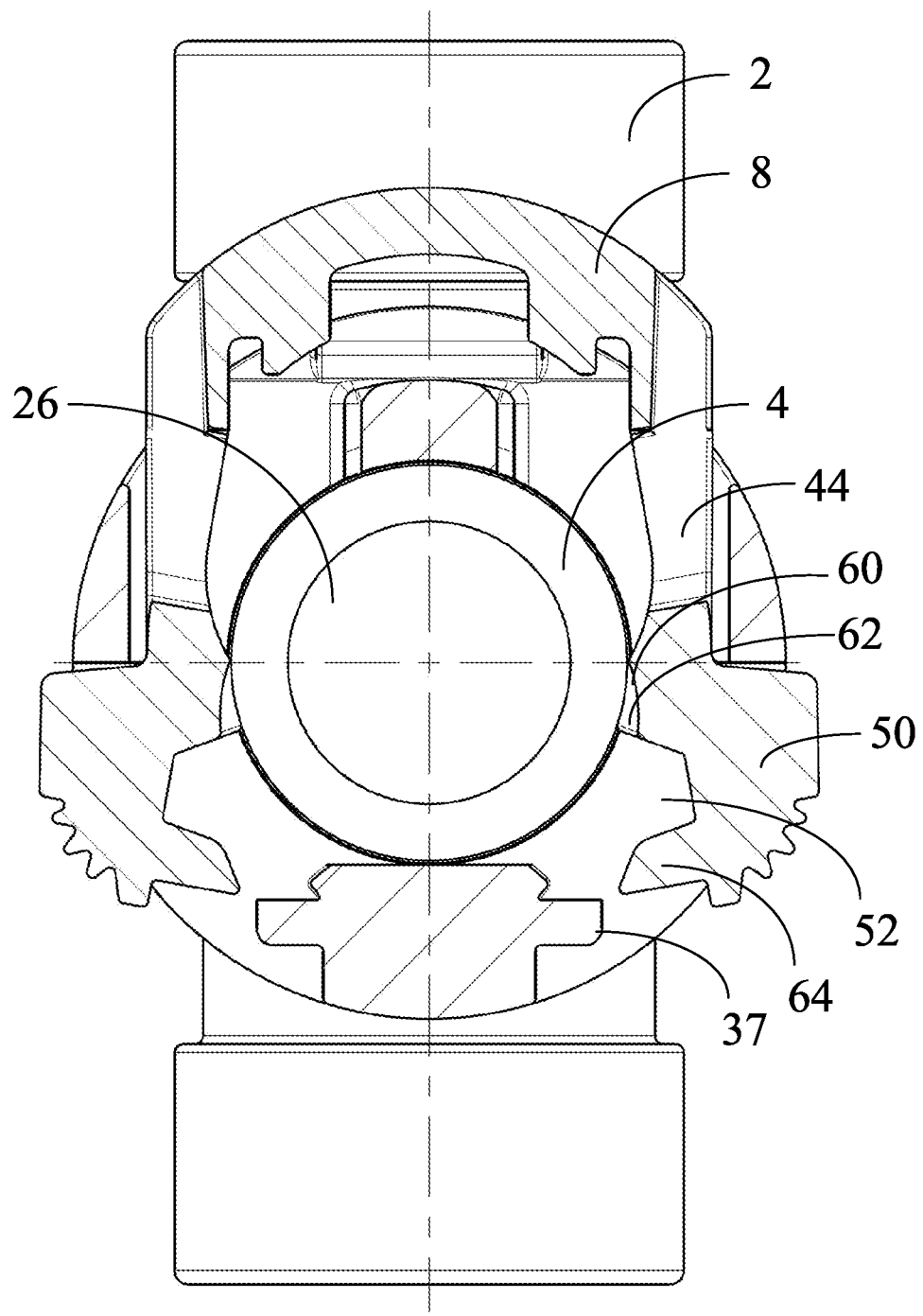
FIG. 4B is a cross-sectional structural schematic diagram taken along line A-A in FIG. 4A.
Figure 4C:
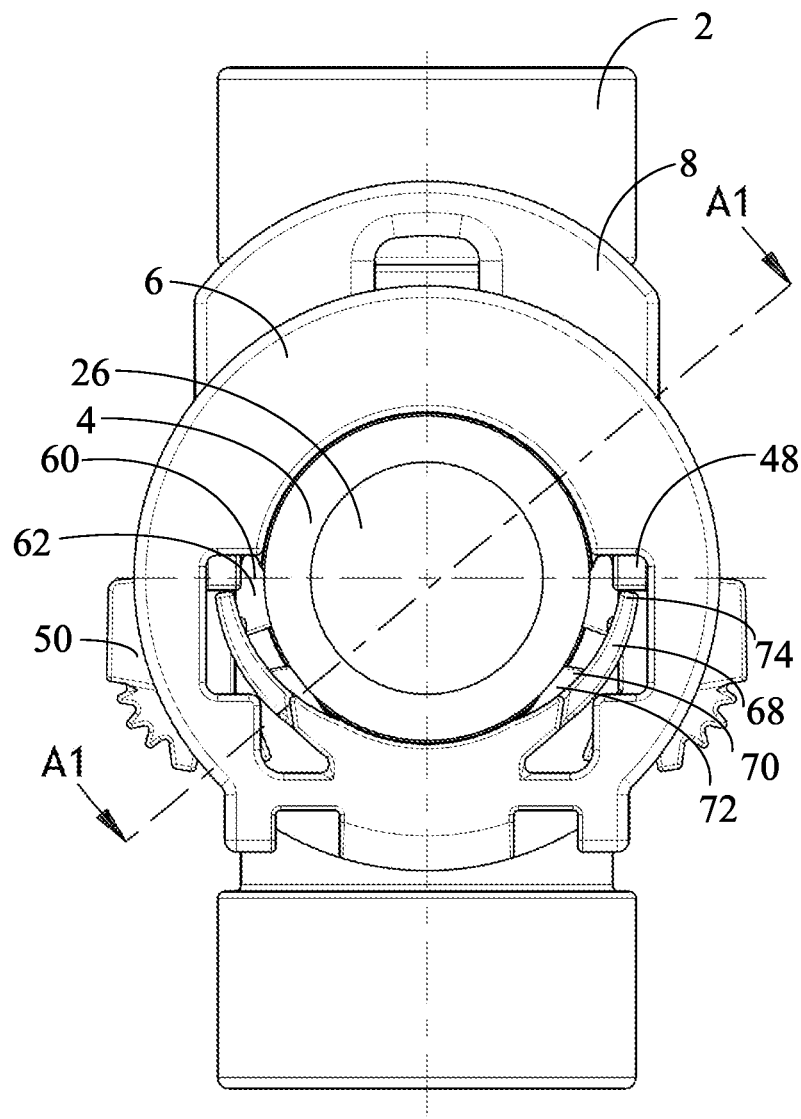
FIG. 4C is a front structural schematic diagram of the quick connector according to the first embodiment of the present invention when the fluid pipeline is partially inserted into the sleeving component.

In the process of inserting the fluid pipeline 4 into the sleeving component 6 and making it reach the position shown in FIGS. 4A to 4D, the end 58 of the fluid pipeline 4 first comes into contact with and interferes with the wing protrusions 70 of the main body 30 of the sleeving component 6, forcing the wings 68 to radially separate, so that the ends 74 of the wings 68 face the ends 48 of the retaining arms 40 of the sliding lock 8 (as shown in FIG. 4C), and the wings 68 stop the movement of the sliding lock 8 in the transverse direction.

As the fluid pipeline 4 is further pushed into the receiving hole 26 of the sleeving component 6, the end 58 of the fluid pipeline 4 further comes into contact with the interference portions 60 of the locking arms 44 of the sliding lock 8. The fluid pipeline 4 exerts, in the axial direction, mechanical interference to the interference portions 60 of the locking arms 44 of the sliding lock 8 via pressure. By the axial pushing, the locking arms 44 are first moved axially, but the locking arms 44 are not initially radially separated. The bumps 64 on the front sides 54 of the C-shaped locking hooks 50 still abut against the locking catches 37 of the main body 30 of the sleeving component 6, and thus prevent the sliding lock 8 from transversely entering the gap regions 36 of the inner recess 32 of the sleeving component 6.

As shown in FIG. 4A, when the back sides of the locking arms 44 axially abut against the interior of the main body 30 of the sleeving component 6, the locking arms 44 are axially moved to the farthest positions. In the specific embodiment in which the protrusions 66 are provided on the back sides of the locking arms 44, when the protrusions 66 abut against the interior of the main body 30 of the sleeving component 6, the locking arms 44 are axially moved to the farthest positions. At this time, the locking arms 44 tend to deform by the mechanical interference of the fluid pipeline 4 relative to the sliding lock 8.

As the fluid pipeline 4 is further pushed into the sleeving component 6, the fluid pipeline 4 continues to apply an axial pressure to the interference portions 60, but since the locking arms 44 have abutted against the main body 30 of the sleeving component 6, the locking arms 44 are radially separated and reach a maximum spacing distance at this time, as shown in FIG. 4B. In this case, the position where the interference portions 60 of the locking arms 44 are in contact with the fluid pipeline 4 is below the middle of the fluid pipeline 4, the locking arms 44 are flexible, and the locking arms 44 generate a thrust under the action of their own restoring forces, so that the sliding lock 8 tends to automatically move in the transverse direction towards the interior of the sleeving component 6. However, since the wings 68 are still in a radially separated state, the ends 74 of the wings 68 are still in a facing positional relationship with the ends 48 of the retaining arms 40 of the sliding lock 8 (as shown in FIG. 4C), the wings 68 stop the movement of the sliding lock 8 in the transverse direction. That is to say, in this case, the sliding lock 8 cannot be moved to the locked position.

As shown in FIG. 4B, the C-shaped locking hooks 50 now are outside the locking catches 37. As will be described below, when the sliding lock 8 are transversely moved downward and enters the sleeving component 6, the C-shaped locking hooks 50 move around the locking catches 37 in the gap regions 36 of the sleeving component 6.

Figure 4D:
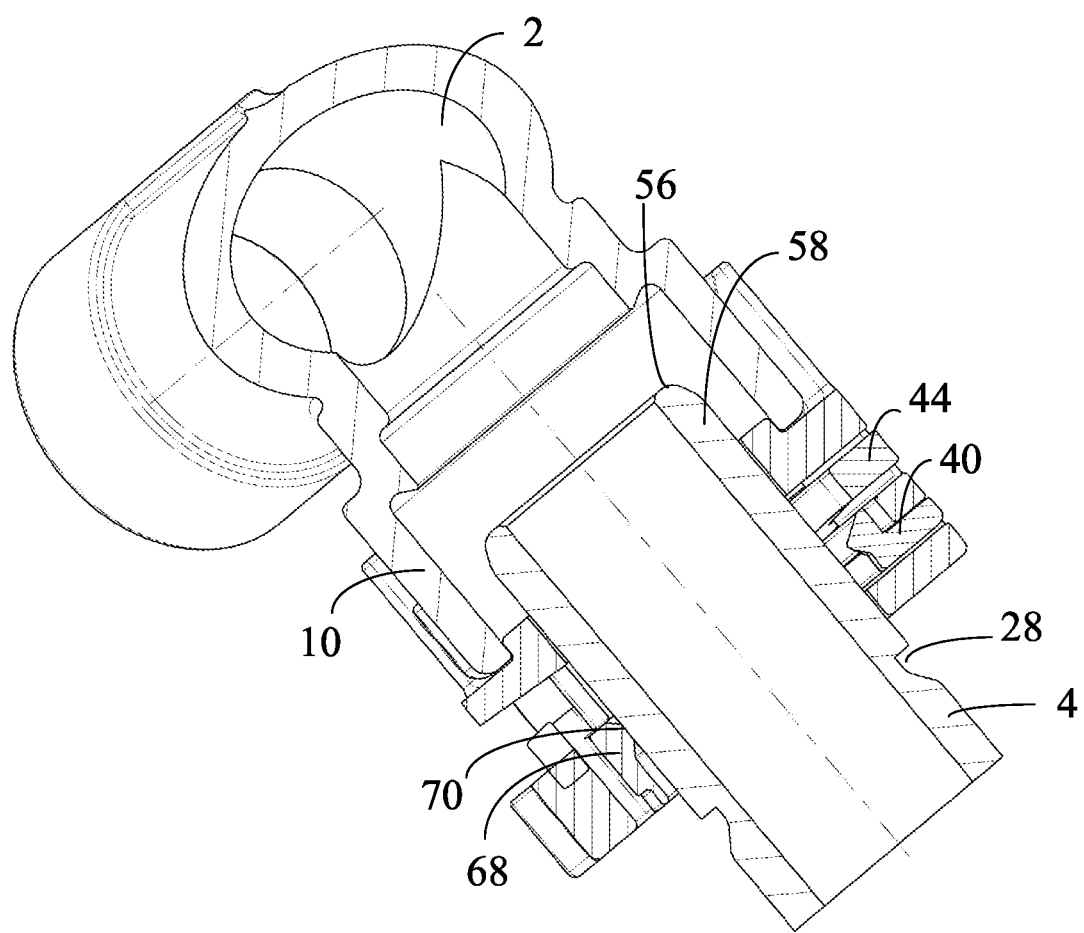
FIG. 4D is a cross-sectional structural schematic diagram taken along line A1-A1 in FIG. 4C.

As can be seen from FIG. 4D, the wing protrusion 70 is located between the end 58 of the fluid pipeline 4 and the annular groove 28 at this stage.

Figure 5A:
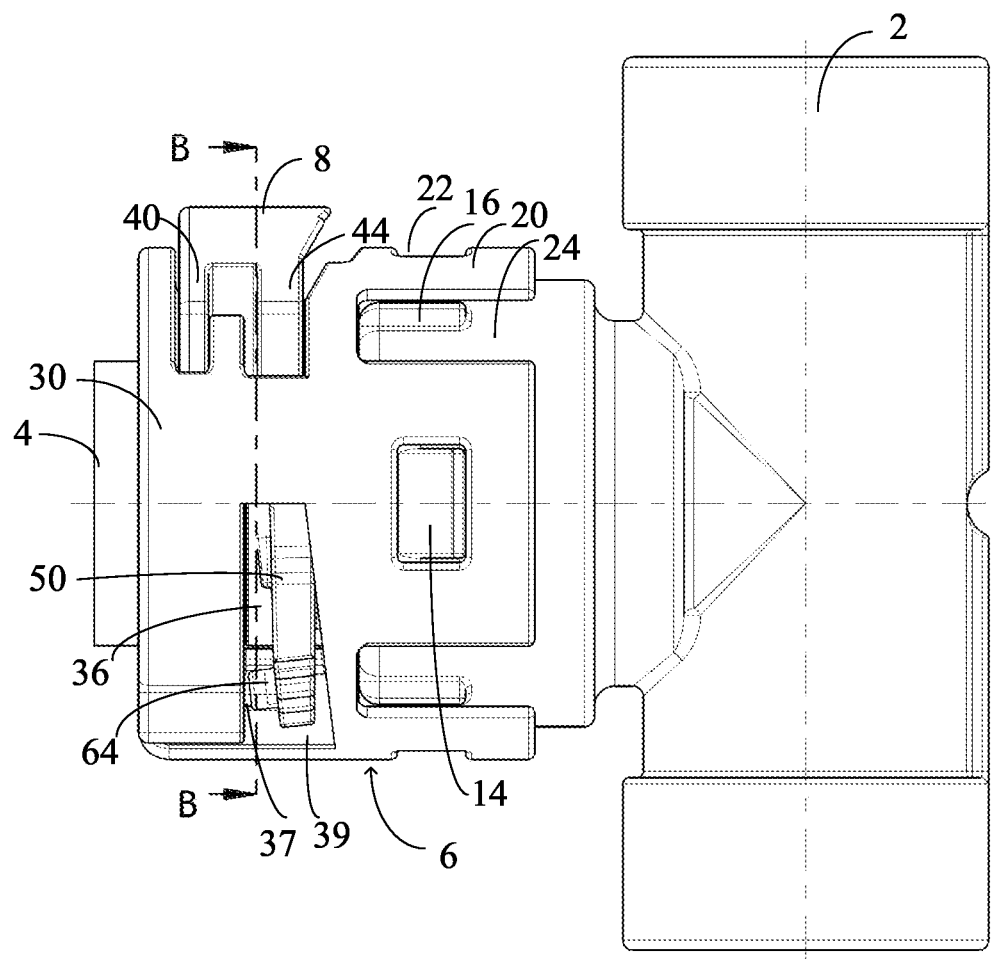
FIG. 5A is a side structural schematic diagram of the quick connector according to the first embodiment of the present invention at a stage in which the fluid pipeline is just completely inserted into the sleeving component and a sliding lock is moving to a locked position.
Figure 5B:
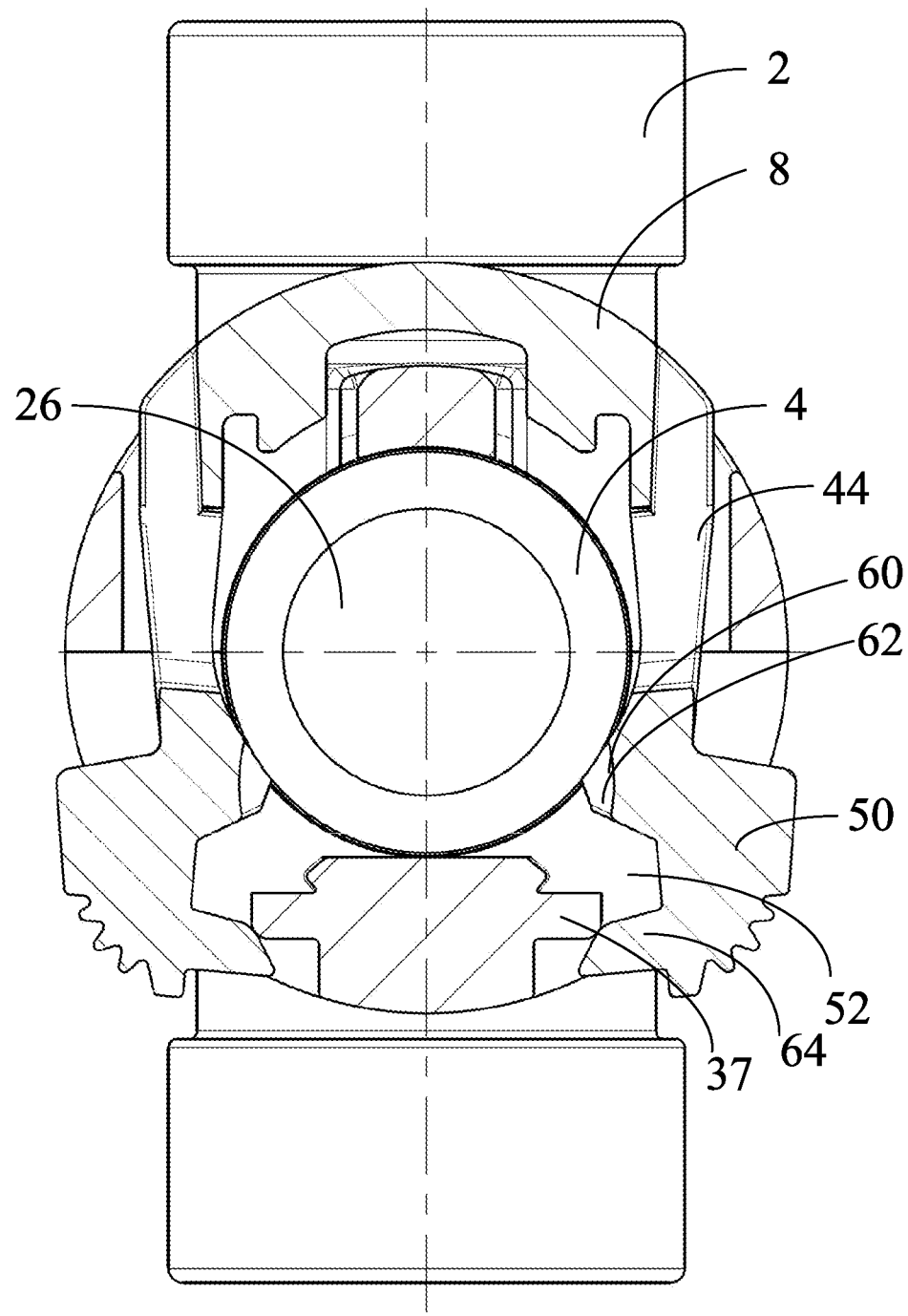
FIG. 5B is a cross-sectional structural schematic diagram taken along line B-B in FIG. 5A.
Figure 5C:
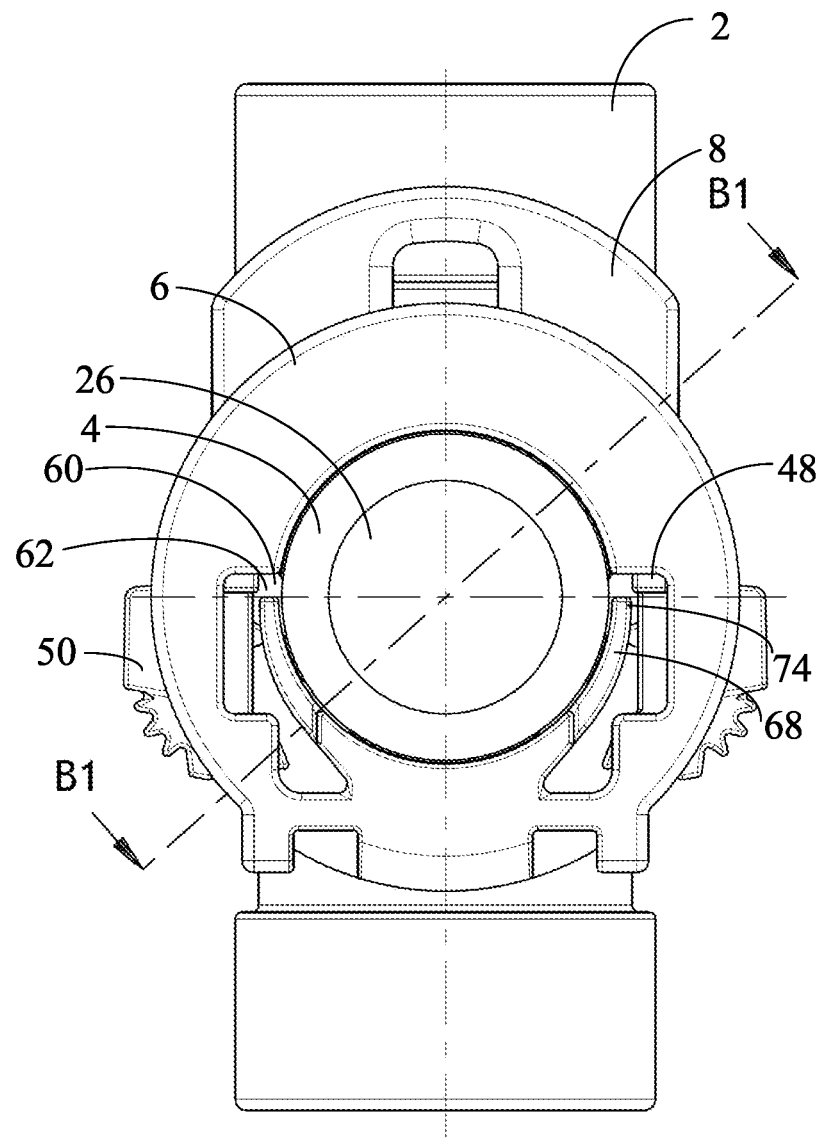
FIG. 5C is a front structural schematic diagram of the quick connector according to the first embodiment of the present invention at a stage in which the fluid pipeline is just completely inserted into the sleeving component and the sliding lock is moving to the locked position.
Figure 5D:
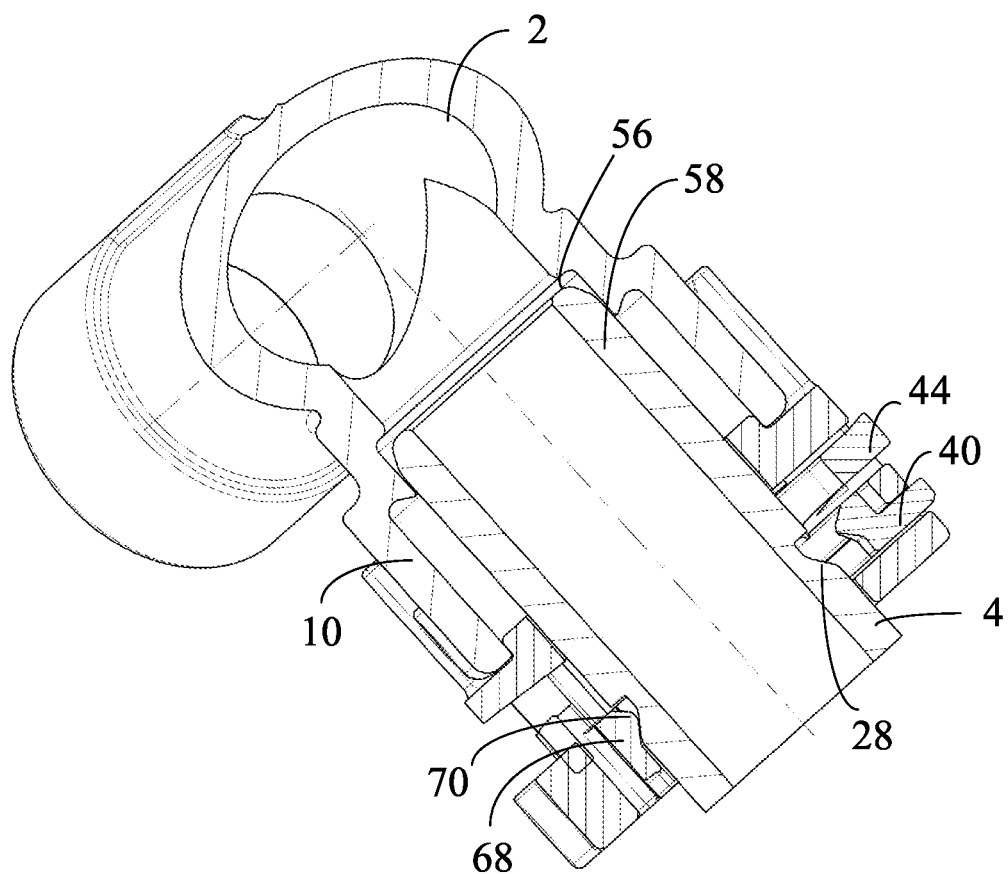
FIG. 5D is a cross-sectional structural schematic diagram taken along the line B1-B1 in FIG. 5C.

FIGS. 5A to 5D show a stage in which the fluid pipeline 4 is just inserted into a fixing position and the sliding lock 8 is being moved towards the locked position. As shown in FIG. 5D, at this stage, the wing protrusion 70 of the main body 30 of the sleeving component 6 is embedded into the annular groove 28 of the fluid pipeline 4, and the flexible wing 68 radially retracts under the action of the restoring force to return to an initial rest position. As shown in FIG. 5C, the ends 74 of the wings 68 no longer face but are offset from the ends 48 of the retaining arms 40, thereby releasing the stopping of the retaining arms 40 by the ends 74 of the wings 68 to the ends 48. That is to say, the movement of the sliding lock 8 in the transverse direction is no longer restricted by the wings 68.

When the fluid pipeline 4 is just inserted into the fixing position, the locking arms 44 are still in a state where the locking arms are spread apart in the radial direction by the fluid pipeline 4. Since the position where the interference portions 60 of the locking arms 44 are in contact with the fluid pipeline 4 is below the middle of the fluid pipeline 4 and since the locking arms 44 are flexible, the locking arms 44 generate a thrust under the action of their own restoring forces, the sliding lock 8 tends to automatically move in the transverse direction towards the interior of the sleeving component 6. Moreover, as described above, the movement of the sliding lock 8 in the transverse direction is no longer restricted by the wings 68. Therefore, the locking arms 44 are radially moved, under the action of their own restoring forces, towards each other, then retract, and also axially retract in a direction opposite to the direction in which the fluid pipeline 4 is inserted, so as to return to the initial rest positions of the locking arms 44. The two retracting movements generate a thrust on the sliding lock 8, so that the sliding lock 8 automatically transversely moves within the inner recess 32 towards the interior of the sleeving component 6, as shown in FIG. 5B, until the sliding lock reaches the locked position in the sleeving component 6. During this process, the C-shaped locking hooks 50 move around the locking catches 37, and the C-shaped locking hooks 50 move from the outside of the locking catches 37 to the openings 52 of the C-shaped locking hooks 50 to surround the locking catches 37.

Figure 6A:
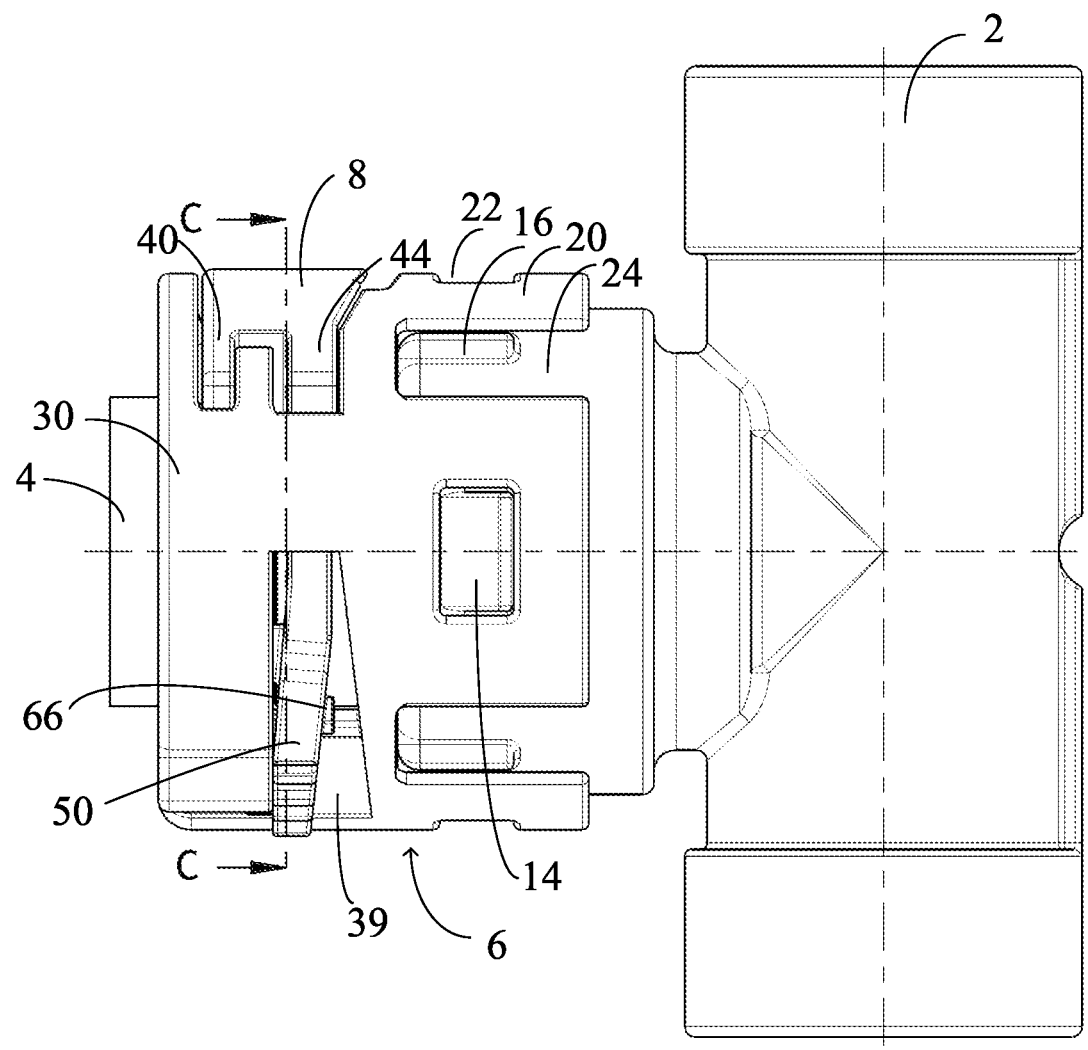
FIG. 6A is a side structural schematic diagram of the quick connector according to the first embodiment of the present invention at a stage in which the fluid pipeline has been completely inserted into the sleeving component and the sliding lock has been moved to the locked position.
Figure 6B:
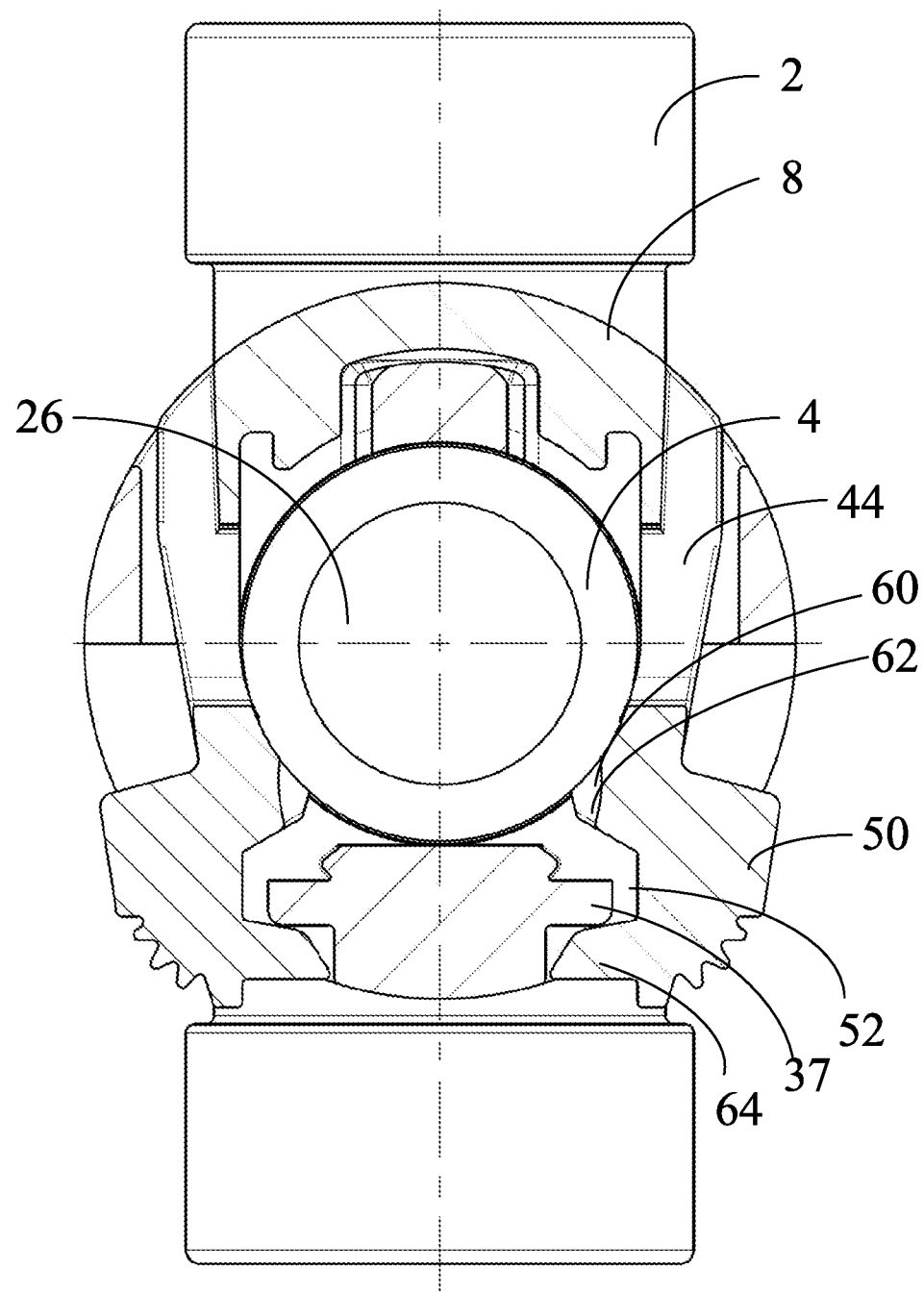
FIG. 6B is a cross-sectional structural schematic diagram taken along line C-C in FIG. 6A.
Figure 6C:
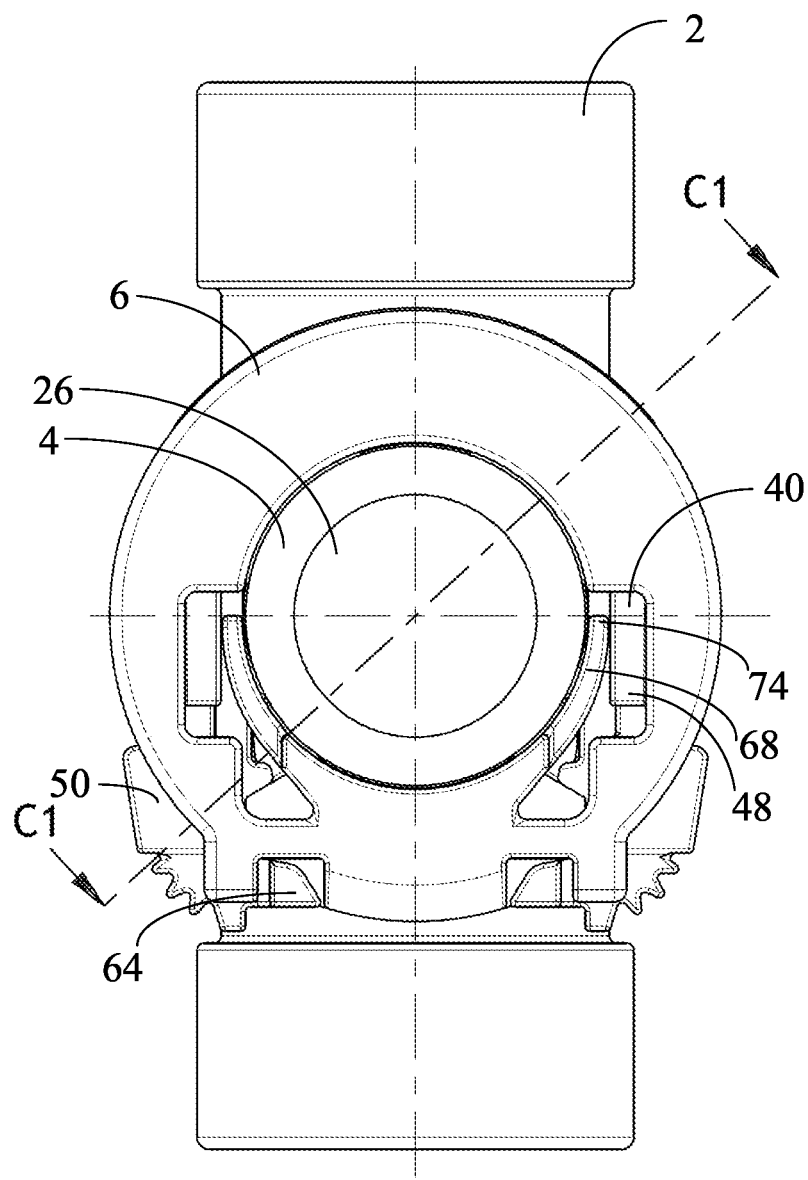
FIG. 6C is a front structural schematic diagram of the quick connector according to the first embodiment of the present invention at a stage in which the fluid pipeline has been completely inserted into the sleeving component and the sliding lock has been moved to the locked position.
Figure 6D:
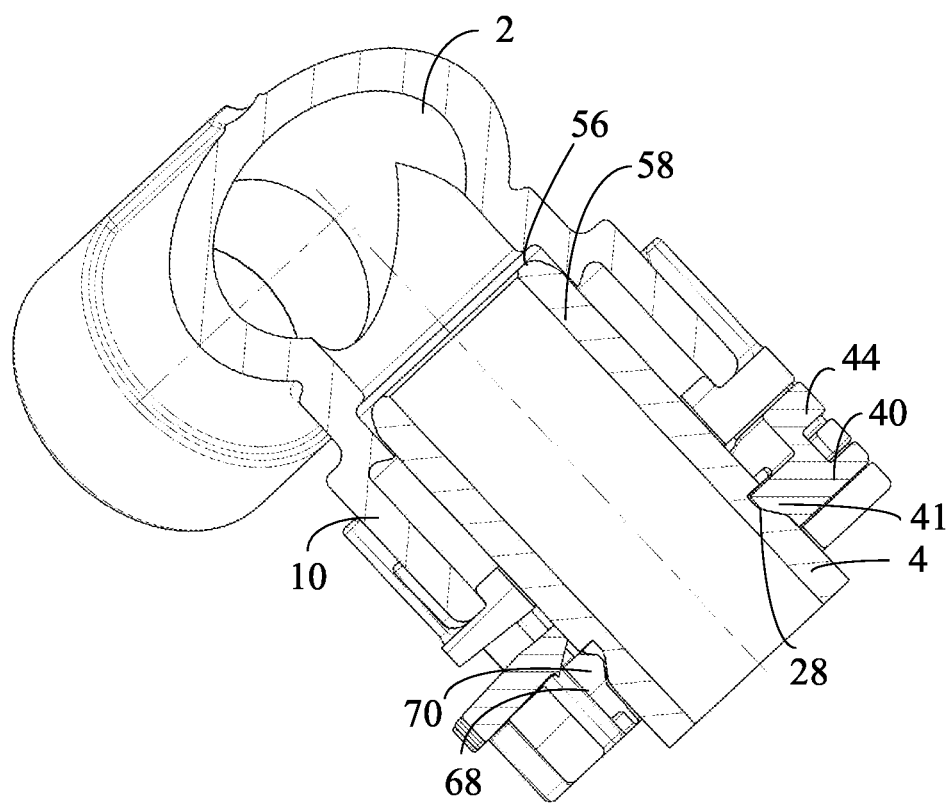
FIG. 6D is a cross-sectional structural schematic diagram taken along line C1-C1 in FIG. 6C.
Figure 7:
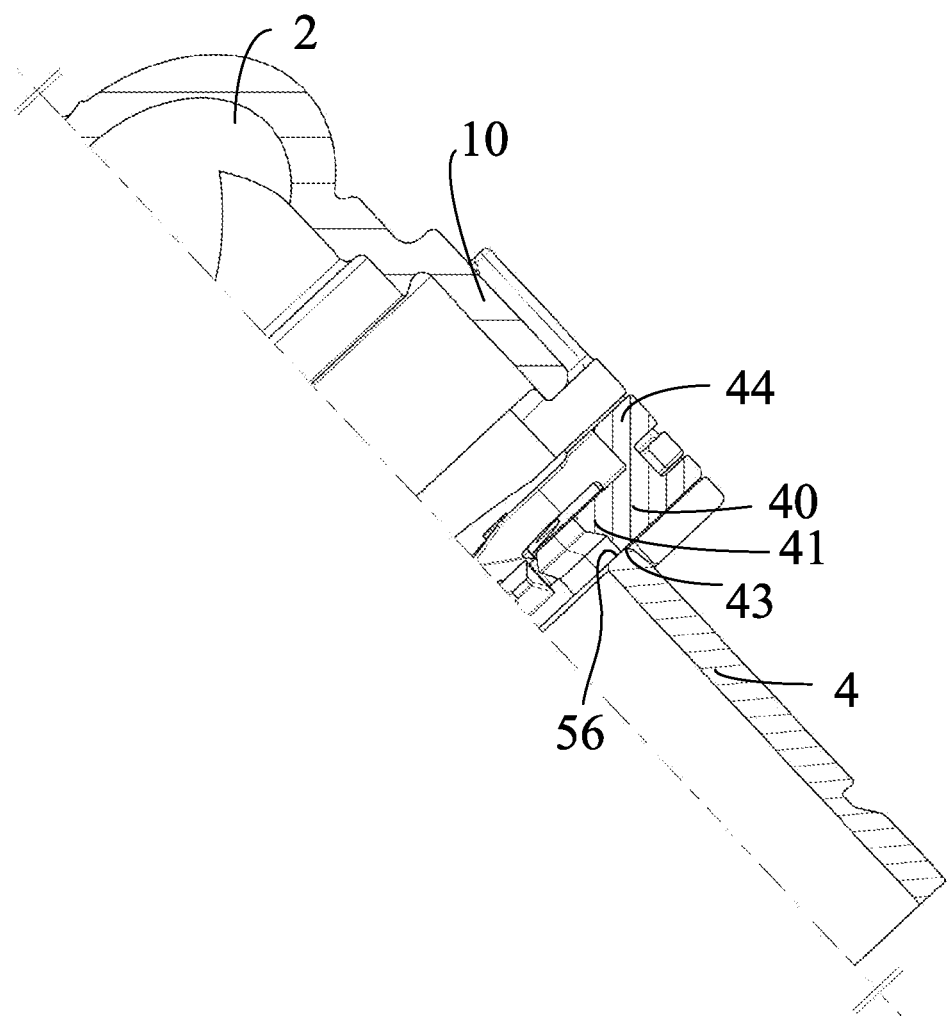
FIG. 7 is a partial cross-sectional structural schematic diagram of the quick connector according to the first embodiment of the present invention when the fluid pipeline is not inserted into the sleeving component and the sliding lock is accidentally moved to the locked position.

FIGS. 6A to 6D show a stage in which the sliding lock 8 is in the locked position and the sliding lock 8 locks the fluid pipeline 4. Through the stage shown in FIGS. 5A to 5D, the sliding lock 8 is moved to the locked position in the sleeving component 6, as shown in FIG. 6C, and the locking arms 44 of the sliding lock 8 have been retracted to the initial rest positions in the axial direction, as shown in FIG. 6A. The locking catches 37 are finally accommodated within the openings 52 of the C-shaped locking hooks 50, as shown in FIG. 6B. In this state, the sliding lock 8 can be no longer moved upward transversely in the main body 30 of the sleeving component 6. Moreover, in this state, since the retaining arms 40 of the sliding lock 8 are embedded into the annular groove 28 of the fluid pipeline 4 (as shown in FIG. 6D), the fluid pipeline 4 is axially restricted in the sleeving component 6. With this arrangement, the fluid pipeline 4 is locked within the sleeving component 6, and the fluid pipeline 4 is firmly connected to the sleeving component 6.

As shown in FIG. 6C, in this position, the top of the sliding lock 8 (i.e., the U-shaped bottom of the first fork 38 and the second fork 42) is flush with the outer surface (the top surface in the figure) of the sleeving component 6.

FIGS. 8 to 10B show a quick connector 101 according to a second embodiment of the present disclosure.

The quick connector 101 according to the second embodiment is substantially the same as the quick connector 1 according to the first embodiment in terms of structure and operating principle. The differences between the quick connector 101 and the quick connector 1 will be mainly introduced below, and the common features thereof will not be described in detail.

As shown in FIGS. 8 to 10B, the quick connector 101 mainly comprises a joint section 102, a sleeving component 106 for retaining a fluid pipeline 104, and a sliding lock 108. An annular groove 128 is formed in an outer periphery of the fluid pipeline 104.

In the illustrated embodiment, the joint section 102 is shown in the form of a straight tube. It will be appreciated that the joint section 102 may also be in the form of an elbow or in the form of a T-shaped tee as desired.

The sleeving component 106 has a main body 130. The main body 130 defines a receiving hole 126 and comprises an inner main body portion 131 and an outer main body portion 133 sleeved to each other. In the illustrated embodiment, the joint section 102 is integrally formed with the outer main body portion 133 of the sleeving component 106. It will be appreciated that the joint section 102 and the sleeving component 106 may also be detachably connected to each other as in the first embodiment.

The bottom of the inner main body portion 131 may be provided with a bulge (not shown), and the outer main body portion 133 is correspondingly provided with a hole 157 passing through its circumferential wall and matching the bulge. When the inner main body portion 131 is inserted into the outer main body portion 133, the bulge of the inner main body portion 131 may be engaged into the hole 157 of the outer main body portion 133, thereby realizing the sleeving of the outer main body portion 133 and the inner main body portion 131. The inner main body portion 131 and the outer main body portion 133 are respectively provided with an inner radial opening 159 and an outer radial opening 161, the inner radial opening 159 and the outer radial opening 161 together form a slide channel, and the sliding lock 108 may be inserted into the slide channel in the transverse direction T and slide therein.

The sliding lock 108 is movable between an unlocked position and a locked position after inserted into the main body 130 of the sleeving component 106. The sliding lock 108 is in the form of two forks, the first fork 138 has two retaining arms 140, and the second fork 142 has two locking arms 144. The two forks are connected together via a U-shaped bottom 146. The two retaining arms 140 of the first fork 138 are configured to be embeddable into the annular groove 128 of the fluid pipeline 104 to retain and lock the fluid pipeline 104 in the axial direction.

The sleeving component 106 also has a stop component. The stop component is configured to stop the automatic movement of the sliding lock 108 towards the interior of the sleeving component 106 in the transverse direction T during the insertion of the fluid pipeline 104 into the sleeving component 106, and to release the stopping of the sliding block 108 when the fluid pipeline 104 is completely pushed into the main body 130 of the sleeving component 106.

Figure 8:
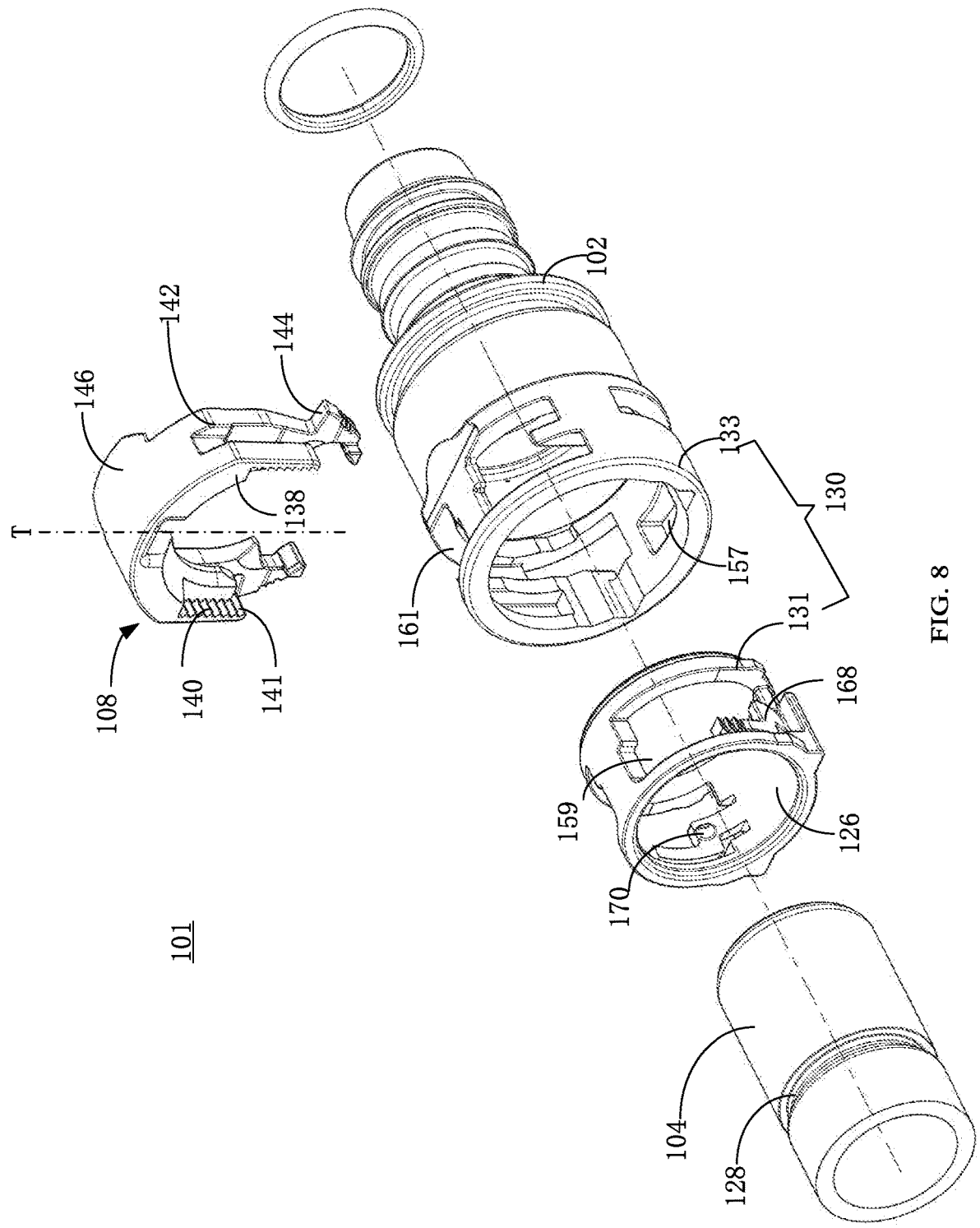
FIG. 8 is an exploded schematic diagram, from one angle of view, of a quick connector according to a second embodiment of the present invention.
Figure 9:
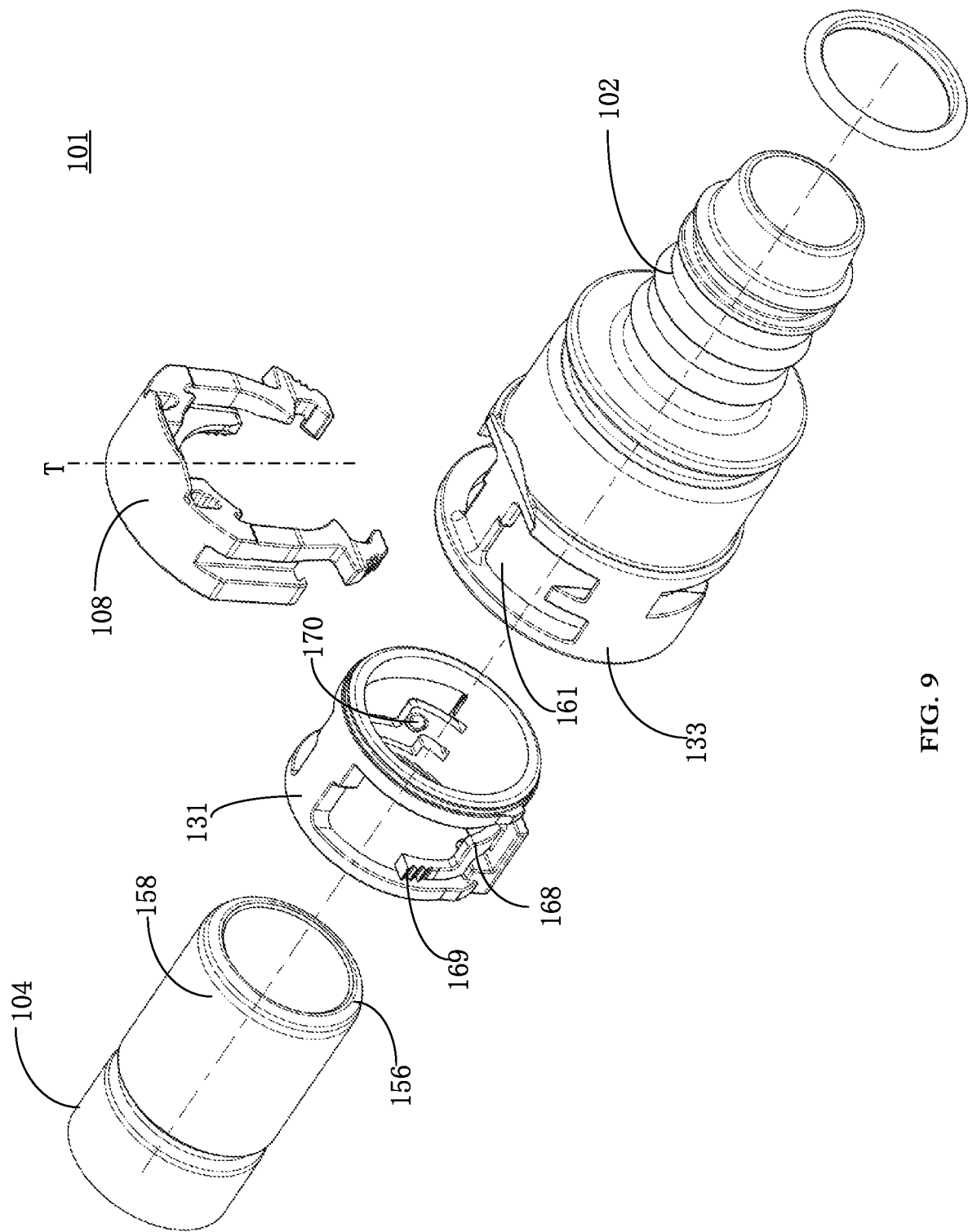
FIG. 9 is an exploded schematic diagram, from another angle of view, of the quick connector according to the second embodiment of the present invention.
Figure 10A:
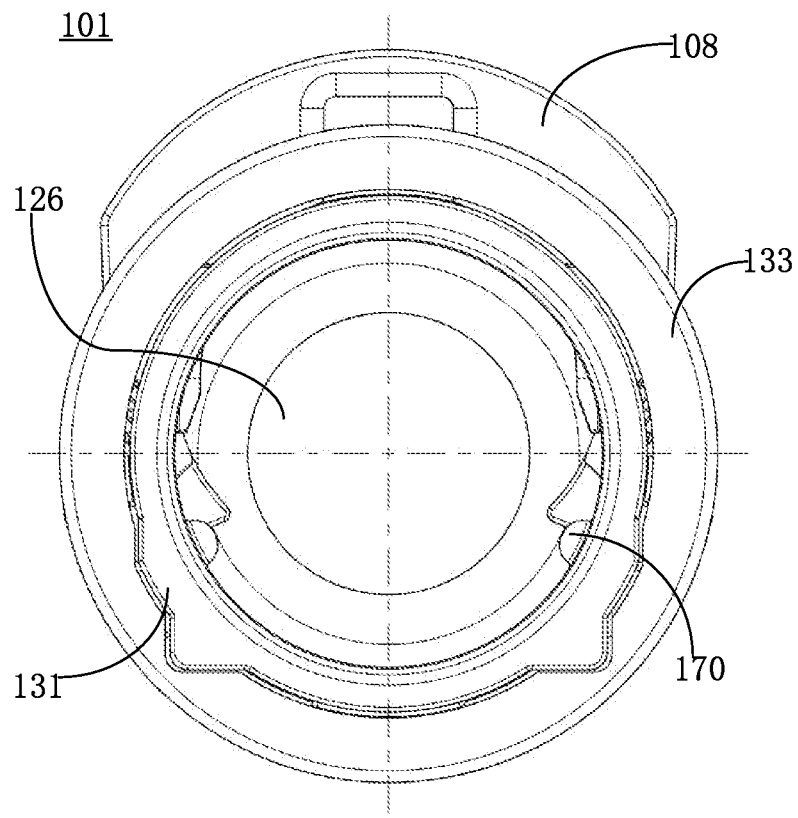
FIG. 10A is a front view of the quick connector according to the second embodiment of the present invention in an assembled state.
Figure 10B:
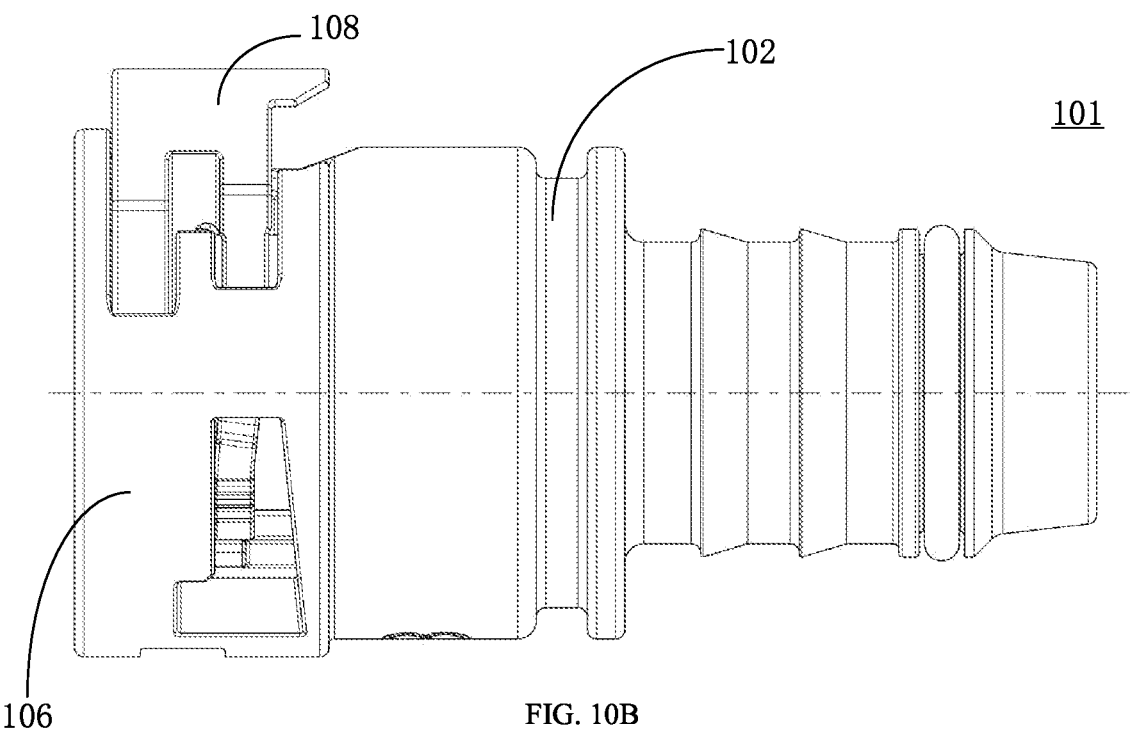
FIG. 10B is a side view of the quick connector according to the second embodiment of the present invention in the assembled state.
Figure 12A:
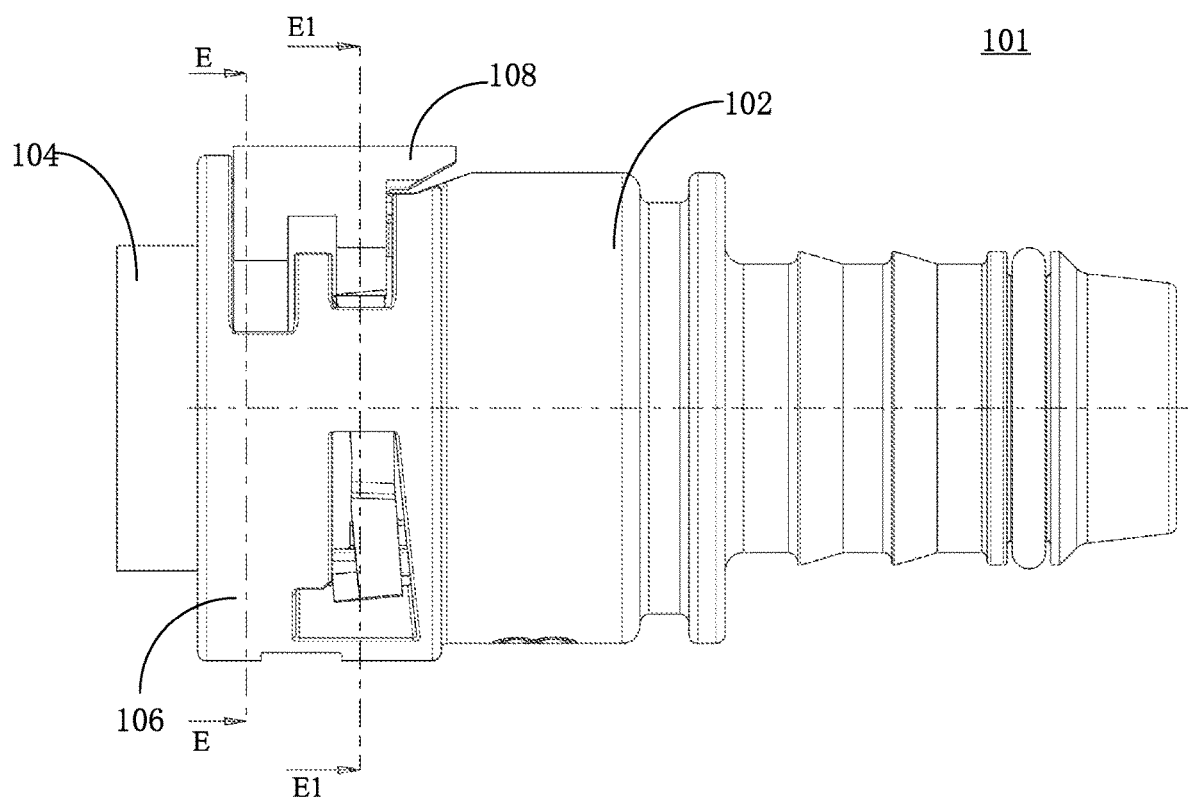
FIG. 12A is a side view of the quick connector according to the second embodiment of the present invention at a stage in which the fluid pipeline is just completely inserted into the sleeving component and a sliding lock is moving to a locked position.

The stop component is provided on the inner main body portion 131 and comprises two wings 168 extending from the bottom of the inner main body portion 131 in a circumferential direction of the receiving hole 126 of the sleeving component 106. In the illustrated embodiment, the two wings 168 are symmetrically arranged. Each wing 168 is provided with a wing protrusion 170 protruding radially towards the interior of the receiving hole 126. The wing protrusions 170 are configured to be insertable into the annular groove 128 of the fluid pipeline 104. As best shown in FIGS. 8, 9 and 12D, in the illustrated embodiment, part of a surface of the wing protrusion 170 is a spherical surface and the other part of the surface is a wedge-shaped surface. It will be appreciated that the entire surface of the wing protrusion 170 may be a spherical surface. The wing protrusion 170 is adapted to interfere with an end face 156 and/or an end 158 of the fluid pipeline 104 when the fluid pipeline 104 is inserted into the sleeving component 106.

Figure 11A:
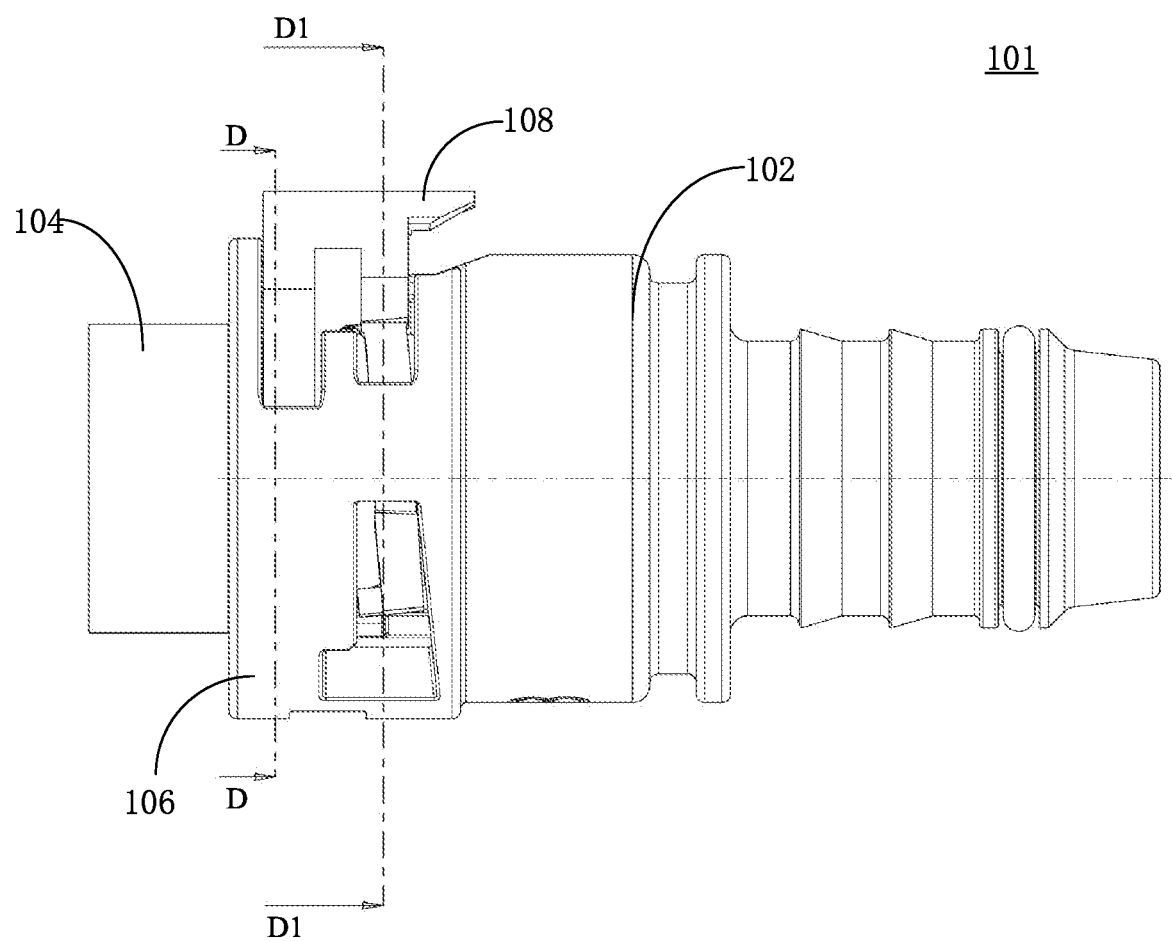
FIG. 11A is a side view of the quick connector according to the second embodiment of the present invention when a fluid pipeline is partially inserted into a sleeving component.
Figure 11B:
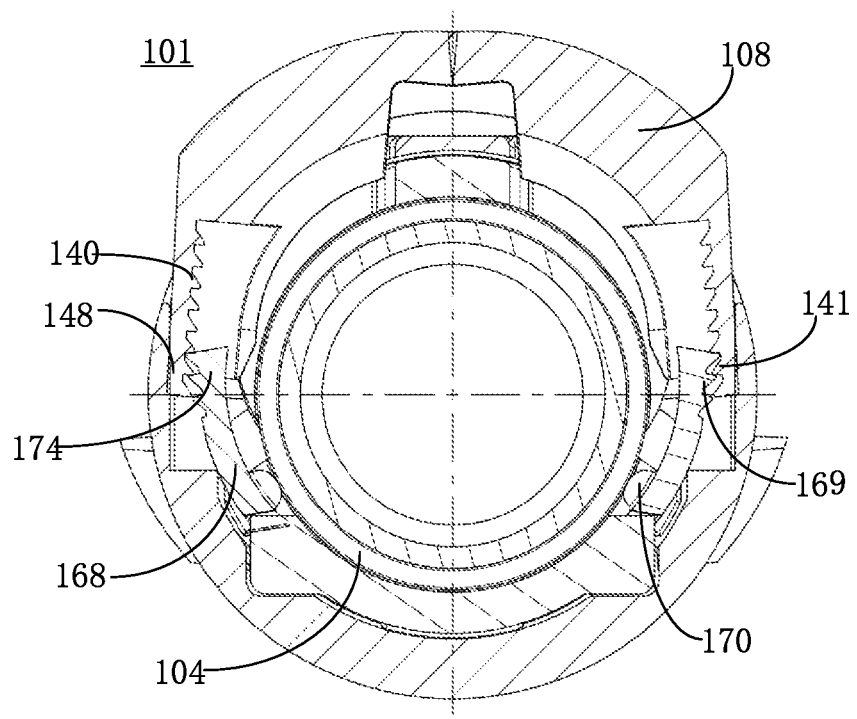
FIG. 11B is a cross-sectional view taken along line D-D in FIG. 11A.
Figure 12B:
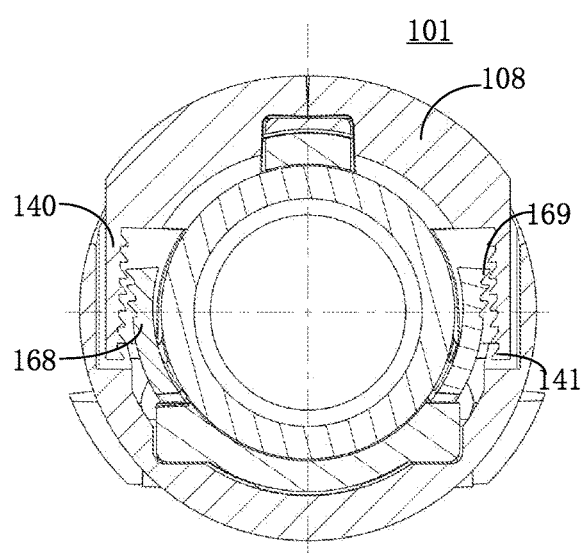
FIG. 12B is a cross-sectional view taken along line E-E in FIG. 12A.

Referring to FIGS. 11B and 12B, the wings 168 are configured such that when the wing protrusions 170 mechanically interfere with the end 158 of the fluid pipeline 104, the ends 174 of the wings 168 and the ends 148 of the retaining arms 140 are engaged with each other, and when the wing protrusions 170 are embedded into the annular groove 128 of the fluid pipeline 104, the ends 174 of the wings 168 are disengaged from the ends 148 of the retaining arms 140. Specifically, portions of the wings 168 facing the ends 148 of the retaining arms 140 are provided with teeth 169 protruding towards the ends 148 of the retaining arms 140; and the ends 148 of the retaining arms 140 are provided with teeth 141 that match the teeth 169 of the wings 168, the engagement of the retaining arms 140 with the wings 168 is achieved via the teeth 141, 169, thereby preventing the movement of the sliding lock 108 in the transverse direction T. The number of the teeth 141 at the end 148 of the retaining arm 140 may be greater than that of the teeth 169 of the wing 168 to ensure that the teeth 169 of the wing 168 can be engaged with the teeth 141 of the retaining arm 140.

Figure 14:
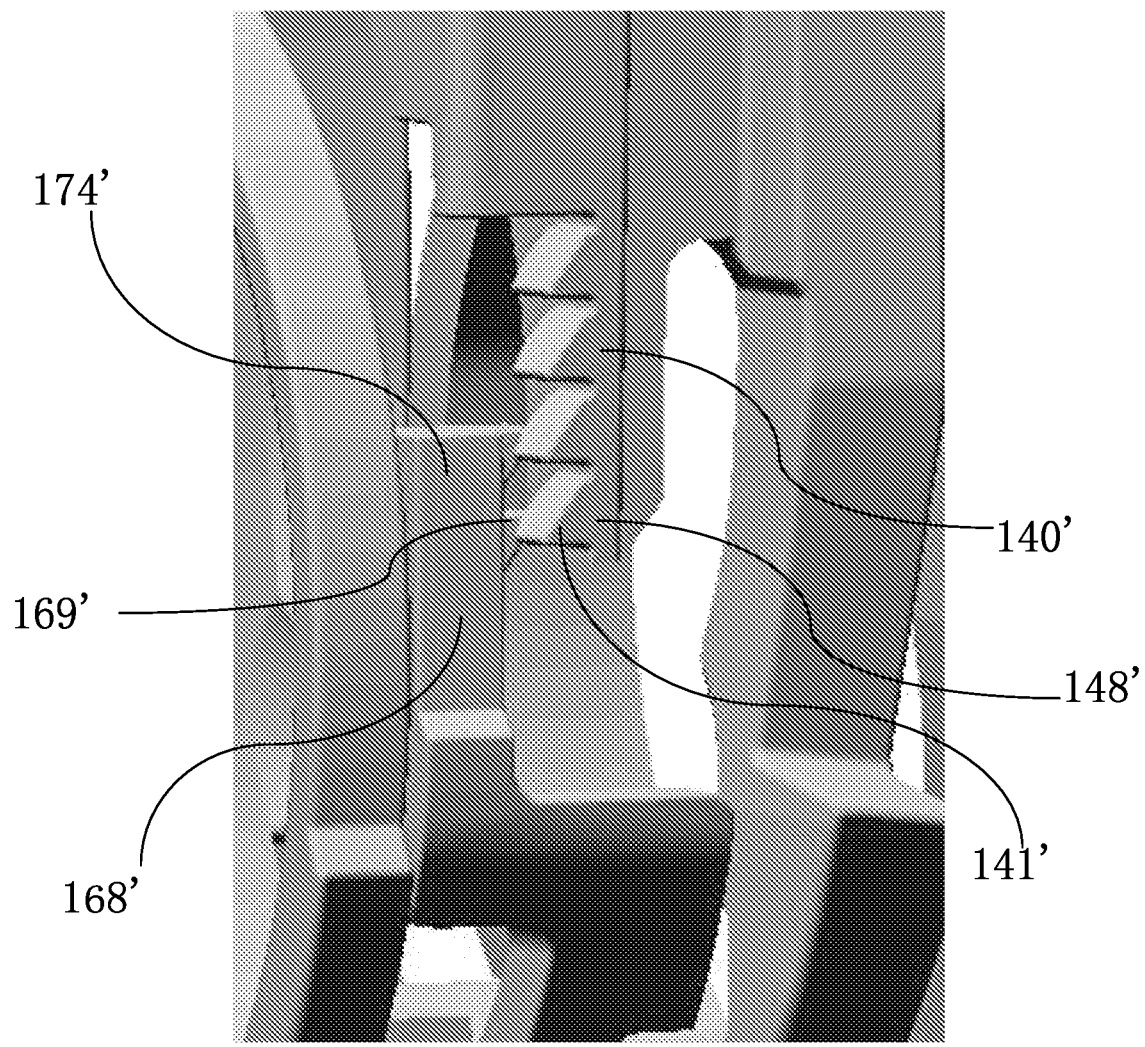
FIG. 14 is a partial perspective view of a quick connector according to a variant of the second embodiment of the present invention.

In the second embodiment shown in FIGS. 8 to 13D, the end 174 of the wing 168 and the end 148 of the retaining arm 140 face each other in the radial direction. It will be appreciated that as shown in FIG. 14, in a variant of the second embodiment, an end 174' of a wing 168' and an end 148' of a retaining arm 140' may also be configured to face each other in an axial direction when being engaged with each other. In this case, a portion of the wing 168' facing the end 148' of the retaining arm 140' is provided with teeth 169' protruding towards the end 148' of the retaining arm 140' in the axial direction, while the end 148' of the retaining arm 140' is provided with teeth 141' matching the teeth 169' of the wing 168'.

It is more reliable to prevent the sliding lock 108 from moving in the transverse direction T by the mutual engagement of the teeth 169 of the wing 168 and the teeth 141 of the retaining arm 140 of the sliding lock 108 in the second embodiment, in comparison with the mode of preventing the sliding lock 8 from moving in the transverse direction T by making the ends 74 of the wings 68 face the ends 48 of the retaining arms 40 of the sliding lock 8 in the first embodiment. Since the number of the teeth 141 of the end 148 of the retaining arm 140 is greater than that of the teeth 169 of the wing 168, even if the retaining arm 140 and the wing 168 are mismatched somewhat due to vibration, the teeth 169 of the wing 168 can also be engaged with the teeth 141 of the retaining arm 140, thereby reliably preventing the movement of the sliding lock 108.

When the fluid pipeline 104 is not inserted into the sleeving component 106, the wing 168 is in its initial position, and the wing 168 and the retaining arm 140 are separated from each other in this case.

Figure 11C:
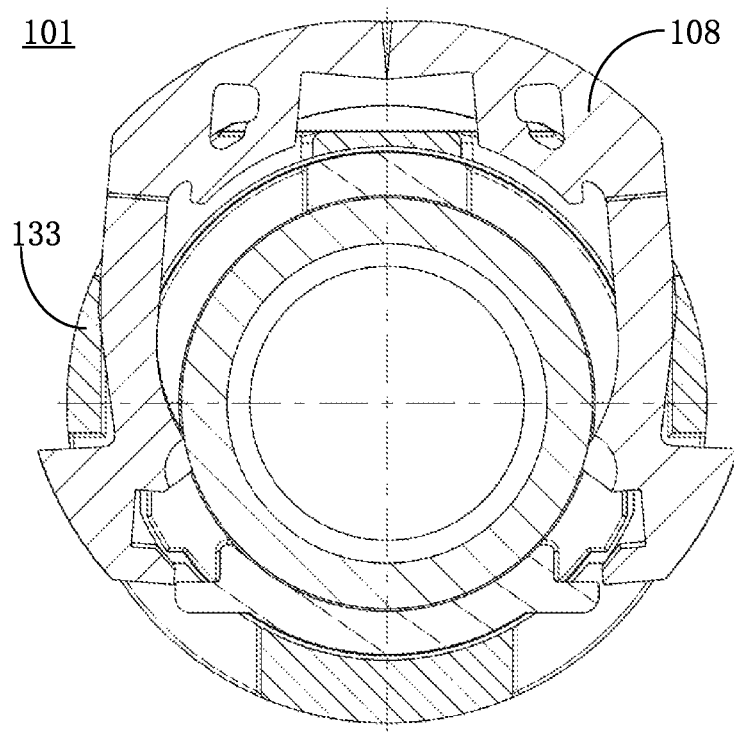
FIG. 11C is a cross-sectional view taken along line D1-D1 in FIG. 11A.

Referring to FIGS. 11A to 11C, when the fluid pipeline 104 is partially inserted into the sleeving component 106, the end 158 of the fluid pipeline 104 mechanically interferes with the wing protrusion 170 of the sleeving component 106, the wing 168 radially elastically deforms, and the end 174 of the wing 168 radially moves outward such that the teeth 169 of the wing 168 and the teeth 141 of the retaining arm 140 are engaged with each other, thereby preventing the sliding lock 108 from moving in the transverse direction T.

Figure 12C:
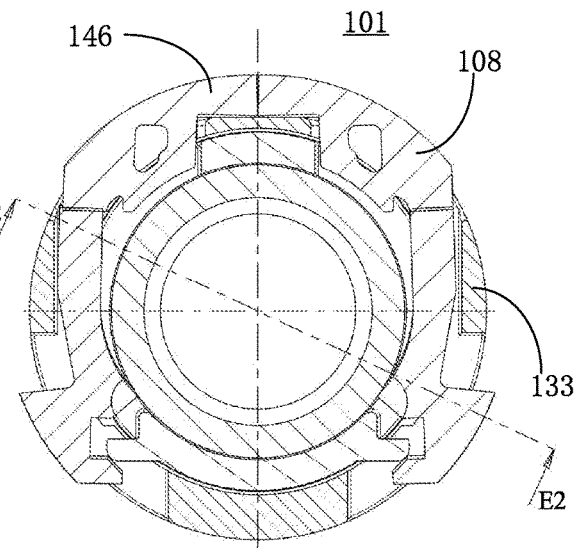
FIG. 12C is a cross-sectional view taken along line E1-E1 in FIG. 12A.
Figure 12D:
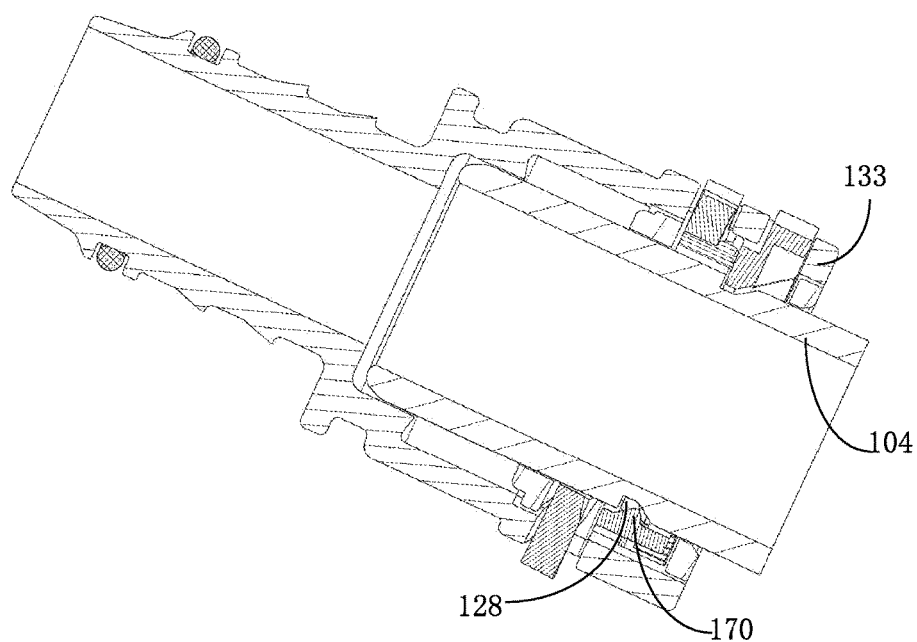
FIG. 12D is a cross-sectional view taken along line E2-E2 in FIG. 12C.
Figure 13A:
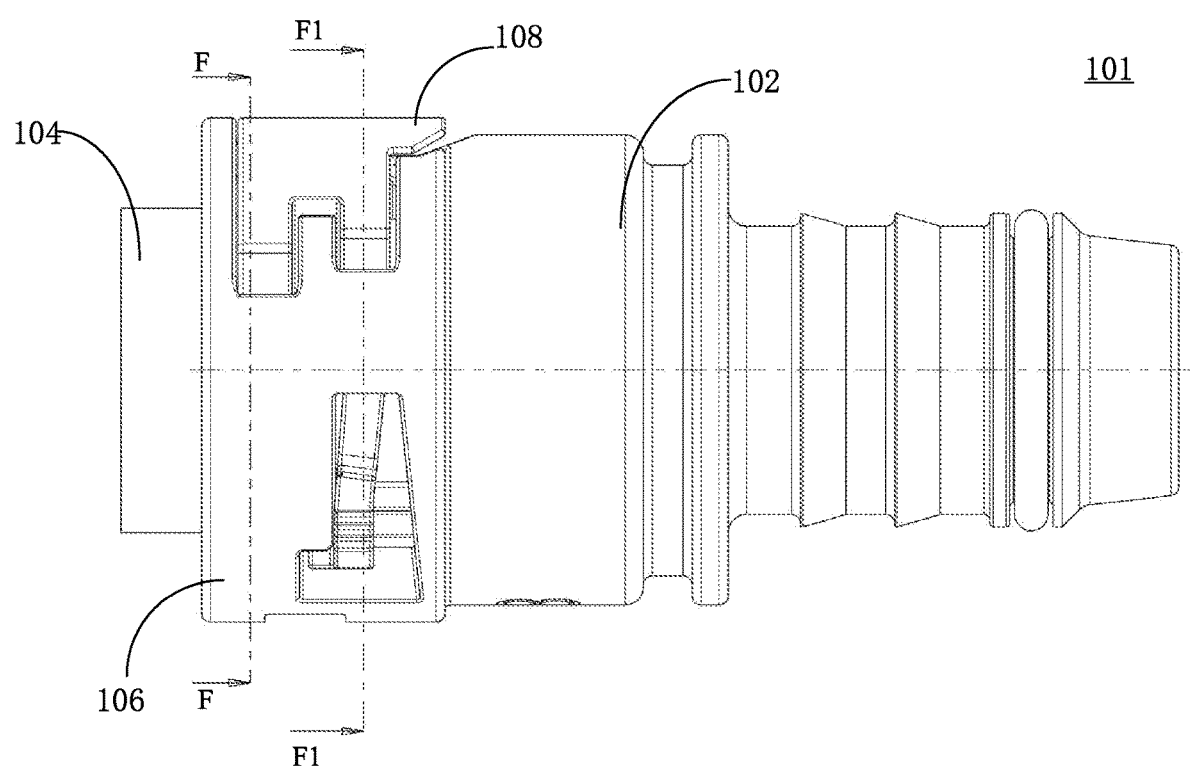
FIG. 13A is a side view of the quick connector according to the second embodiment of the present invention at a stage in which the fluid pipeline is completely inserted into the sleeving component and the sliding lock has been moved to the locked position.
Figure 13B:
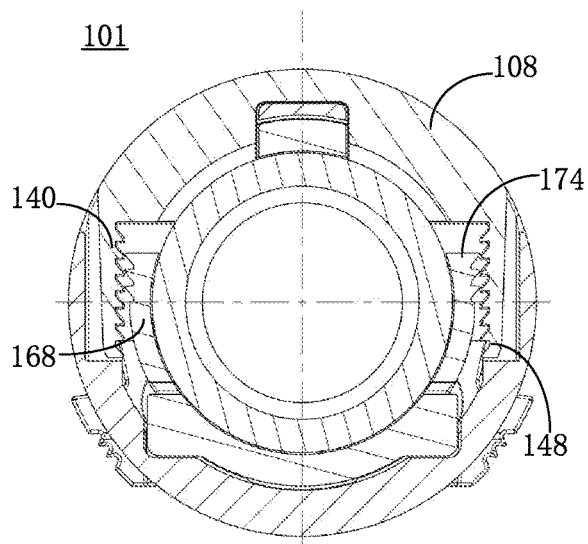
FIG. 13B is a cross-sectional view taken along line F-F in FIG. 13A.
Figure 13C:
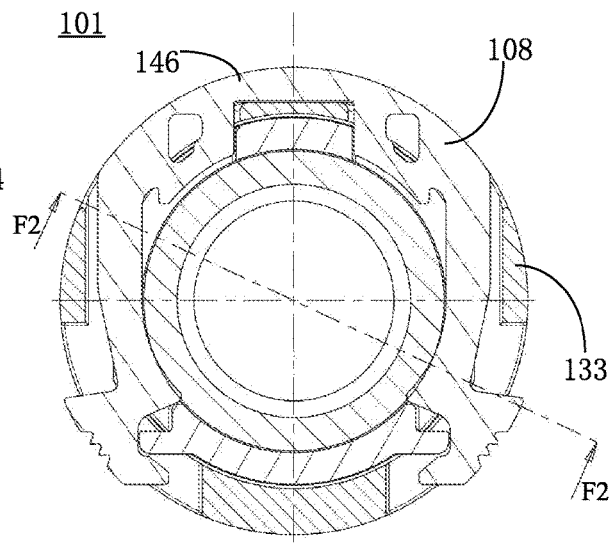
FIG. 13C is a cross-sectional view taken along line F1-F1 in FIG. 13A.
Figure 13D:
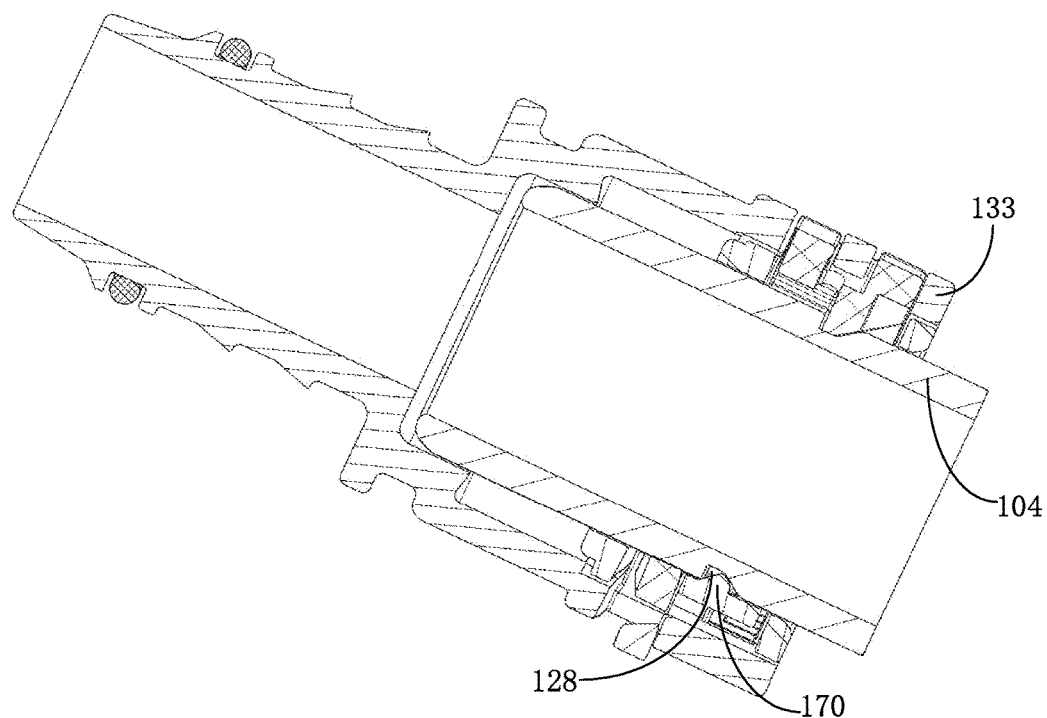
FIG. 13D is a cross-sectional view taken along line F2-F2 in FIG. 13C.

Referring to FIGS. 12A to 12D, when the fluid pipeline 104 is just completely inserted into the sleeving component 106, the wing protrusion 170 of the wing 168 is embedded into the annular groove 128 of the fluid pipeline 104, the wing 168 is radially moved inward back to the initial position by its own restoring force, and the teeth 169 of the wing 168 are disengaged from the teeth 141 of the retaining arm 140. That is, the stopping of the retaining arm 140 by the wing 168 is released, allowing the downward movement of the sliding lock 108 in the transverse direction T. It can be clearly seen in conjunction with FIG. 11A as well as FIGS. 12A and 12C, the sliding lock 108 in FIGS. 12A and 12C is moved downward by a certain distance in the transverse direction T.

Referring to FIGS. 13A to 13D, the sliding lock 108 is further moved downward in the transverse direction T to the locked position, and the outer surface of the U-shaped bottom 146 of the sliding lock 108 is substantially flush with the outer surface of the outer main body portion 133 in this case. In this way, the operator can reliably determine visually or tactilely whether the sliding lock 108 is in the locked position.

According to the disclosed inventive concept, reliable and leak-proof connection can be established between the fluid pipeline and the quick connector. The quick connector described and illustrated herein is smaller in size and has a visual mistake-proofing function, and the sliding lock would not move to the locked position even under an external force during the insertion of the fluid pipeline. When the fluid pipeline is inserted into the fixing position, the sliding lock automatically moves to the locked position without the need for manually pressing the sliding lock to the locked position, so that the operation is more convenient.

Those skilled in the art would have readily appreciated, from such discussions as well as from the drawings and claims, that various changes, modifications and variations could be made therein without departing from the true spirit and reasonable scope of the present invention defined by the following claims.

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

The invention claimed is:

1. A quick connector, comprising:
   a sleeving component; and
   a sliding lock;
   the sleeving component comprising a main body defining a receiving hole, wherein the receiving hole is for receiving a fluid pipeline inserted therein in an axial direction, the fluid pipeline having an annular groove;
   wherein the sliding lock extends in an inner recess in the main body of the sleeving component in a transverse direction, and the sliding lock is configured to radially elastically deform towards an outside of the sleeving component via mechanical interference with an end of the fluid pipeline during the insertion of the fluid pipeline into the sleeving component, and automatically move towards an interior of the sleeving component in the transverse direction in response to the radial elastic deformation;
   wherein the sleeving component further comprises a stop component that elastically deforms via mechanical interference with the end of the fluid pipeline and stops the automatic movement of the sliding lock towards the interior of the sleeving component in the transverse direction during the insertion of the fluid pipeline into the sleeving component, and releases the mechanical interference with the end of the fluid pipeline to release the stopping of the sliding lock under the action of an elastic restoring force when the fluid pipeline is completely pushed into the main body of the sleeving component; and
   wherein the sliding lock further comprises at least one locking hook, wherein the locking hook matches a locking catch provided in the main body of the sleeving component, and when the fluid pipeline is completely pushed into the main body of the sleeving component, the locking hook moves around the locking catch and surrounds the locking catch.

2. The quick connector of claim 1, wherein the stop component is configured to radially elastically deform towards the outside of the sleeving component via mechanical interference with the end of the fluid pipeline during the insertion of the fluid pipeline into the sleeving component so as to stop the sliding lock.

3. The quick connector of claim 2, wherein the sliding lock comprises:
   a first fork; and
   a second fork;
   the first fork comprising two retaining arms embeddable into the annular groove of the fluid pipeline; and
   the second fork comprising two locking arms, with each of the locking arms comprising the locking hook,
   wherein the locking hook defines an opening radially facing the interior of the sleeving component.

4. The quick connector of claim 3, wherein the retaining arm is configured to comprise a stop face, the stop face preventing the fluid pipeline from being inserted into the receiving hole after the sliding lock is moved into a locked position.

5. The quick connector of claim 3, wherein the stop component comprises two wings extending in a circumferential direction of the receiving hole of the sleeving component, each of the wings comprising a wing protrusion protruding radially towards the interior of the sleeving component.

6. The quick connector of claim 5, wherein the wing is configured such that when the wing protrusion mechanically interferes with the end of the fluid pipeline, an end of the wing faces an end of the retaining arm of the sliding lock, and when the wing protrusion is embedded into the annular groove of the fluid pipeline, the end of the wing is offset from the end of the retaining arm of the sliding lock.

7. The quick connector of claim 5, wherein:
   the main body of the sleeving component comprises an outer main body portion and an inner main body portion that are sleeved to each other, and
   the stop component is provided on the inner main body portion.

8. The quick connector of claim 7, wherein the wings extend from a bottom of the inner main body portion in the circumferential direction of the receiving hole of the sleeving component.

9. The quick connector of claim 7, wherein the wings are configured such that when the wing protrusions mechanically interfere with the end of the fluid pipeline, the ends of the wings and the ends of the retaining arms are engaged with each other, and when the wing protrusions are embedded into the annular groove of the fluid pipeline, the ends of the wings are disengaged from the ends of the retaining arms.

10. The quick connector of claim 9, wherein:
    portions of the wings facing the ends of the retaining arms are provided with teeth protruding towards the ends of the retaining arms; and
    the ends of the retaining arms are provided with teeth that match the teeth of the wings, and the engagement with the wings is achieved via the teeth, thereby preventing the transverse movement of the sliding lock.

11. The quick connector of claim 10, wherein the number of the teeth of the end of the retaining arm is greater than that of the teeth of the wing.

12. The quick connector of claim 5, wherein the wing protrusion is configured not to impede insertion or pullout of the fluid pipeline into/from the receiving hole.

13. The quick connector of claim 1, wherein the sliding lock comprises an interference portion provided on a front side thereof, the interference portion being inclined relative to the axial direction, and the interference portion being arranged below the middle of the receiving hole of the sleeving component.

14. The quick connector of claim 1, wherein the sliding lock and the main body of the sleeving component are configured such that during the mechanical interference, the locking hook axially protrudes into the main body of the sleeving component before the sliding lock radially elastically deforms, and wherein the locking hook moves around the locking catch and finally surrounds the locking catch in response to the radial elastic deformation and axial elastic deformation of the sliding lock.

15. The quick connector of claim 1, wherein a bottom of the locking hook initially abuts against the locking catch, the locking hook is in the inner recess of the main body of the sleeving component, and the locking hook is arranged in a gap region.

* * * * *